US006002993A

United States Patent [19]

Naito et al.

[11] Patent Number: 6,002,993

[45] Date of Patent: Dec. 14, 1999

[54] APPARATUS FOR MONITORING WALL SURFACE

[75] Inventors: Shuji Naito; Takanori Kajiya; Masato Sugiula; Masahiko Yokomizo, all of Futtsu, Japan

[73] Assignee: Nippon Steel Corporation, Tokyo, Japan

[21] Appl. No.: 08/952,896

[22] PCT Filed: Apr. 3, 1997

[86] PCT No.: PCT/JP97/01154

§ 371 Date: Nov. 24, 1997

§ 102(e) Date: Nov. 24, 1997

[87] PCT Pub. No.: WO97/38278

PCT Pub. Date: Oct. 16, 1997

[30] Foreign Application Priority Data

| | | | |
|---|---|---|---|
| Apr. 4, 1996 | [JP] | Japan | 8-082447 |
| Apr. 4, 1996 | [JP] | Japan | 8-082448 |
| Apr. 11, 1996 | [JP] | Japan | 8-089136 |

[51] Int. Cl.$^{6}$ .......... G06T 5/40

[52] U.S. Cl. .......... 702/154; 382/141; 348/83

[58] Field of Search .......... 702/154; 382/141, 382/149, 171; 348/82, 83

[56] References Cited

U.S. PATENT DOCUMENTS

| | | | |
|---|---|---|---|
| 4,131,914 | 12/1978 | Bricmont | 358/100 |
| 4,196,471 | 4/1980 | McClure | 364/426 |
| 4,577,385 | 3/1986 | Omae et al. | 29/402.18 |
| 5,715,328 | 2/1998 | Tsukihara | 382/141 |

FOREIGN PATENT DOCUMENTS

| | | |
|---|---|---|
| 0 727 658 | 8/1996 | European Pat. Off. . |
| 63-252242 | 10/1988 | Japan . |
| 3-105195 | 1/1991 | Japan . |
| 7-243975 | 9/1995 | Japan . |

*Primary Examiner*—Patrick Assouad
*Attorney, Agent, or Firm*—Kenyon & Kenyon

[57] ABSTRACT

An apparatus provides a correct image of the surface of an inner wall of a narrow red-hot coking chamber of a coke oven. The apparatus employs linear CCD cameras (LC2 to LC5). The cameras are arranged so that optical axes thereof obliquely cross the inner wall. The cameras are moved by a carriage (HSA) with a linear view field of the cameras being substantially in parallel with the inner wall. The cameras provide linear images while being moved. The linear images are combined into a two-dimensional image and stored in an image memory under the control of an image processing unit (11A). The image is read out of the memory and displayed or printed on an output unit (10, MOV, CPTR, PTR).

22 Claims, 20 Drawing Sheets

APPARATUS FOR MONITORING WALL SURFACE

FIELD OF THE INVENTION

The present invention relates to an apparatus for remotely monitoring the surface of a wall of a structure, and particularly, to an apparatus for photographing the surface of a wall of a structure that is installed in a difficult to access environment. For example, the apparatus is used to monitor the surface of a red-hot inner wall of a coke oven. In this case, the apparatus is installed on a front end of a lance that has a water-cooled structure accommodating linear cameras and laser distance measuring units so as to be inserted into the coke oven. The front end of the lance may also have a non-contact distance measuring unit. The present invention also relates to an apparatus for detecting the position and inclination of the front end of the lance and correcting values measured from the wall of the coke oven accordingly.

PRIOR ART

A coke oven has many coking chambers and combustion chambers that are alternately arranged. The coking chambers receive coal, and the combustion chambers apply high temperatures of 900 to 1100 degrees centigrade to the coking chambers through walls for about 20 consecutive hours, to produce coke. The coke is discharged out of the coking chambers, and coal is again charged into the coking chambers and heated. These processes are repeated, and the coking chambers are always exposed to high temperatures.

FIG. 5(*a*) is a front perspective view showing one of the coking chambers. The coking chamber has an inlet (IN) and an exit (EX). The coking chamber is, for example, 6.5 m high, 0.4 to 0.46 m wide, and 16 m long. The width of the coking chamber is tapered with an inlet width of 0.4 m and an exit width of 0.46 m. The coking chamber is narrow and long. The walls of the coking chamber are made of firebricks each being about 120 mm high, 260 mm wide, and 110 mm thick.

These firebricks are exposed to high temperatures for a long time and to high pressures when a pushing machine discharges the produced coke. Since the firebricks are always exposed to thermal, chemical, and mechanical stresses, they easily suffer joint breakage, cracks, stripping, carbon adhesion, irregularities, and bends, to change the width of the coking chamber. Any damage to the firebricks easily worsens due to stress concentration, and the damaged part has a different thermal conductivity to badly affect coking processes. Small damage on the firebricks is repaired by applying molten refractory material thereto, and a lost firebrick is replaced with another. It is necessary to correctly find and locate damage to the firebricks.

The coking chamber has vertical sidewalls W1 and W2 as shown in FIG. 5(*a*). The sidewalls W1 and W2 must be monitored between coking processes. For this purpose, an industrial television (ITV) camera is used. The camera is inserted into the coking chamber and provides two-dimensional images of the sidewalls. The images are used to inspect the surfaces of the sidewalls.

Japanese Unexamined Patent Publication No. 3-105195 installs a camera on a boom and inserts the boom into the coking chamber. The boom is moved through the coking chamber, and the camera photographs the surfaces of the sidewalls thereof. In FIG. 5(*a*), the width of the coking chamber is 0.4 to 0.46 m, which is very narrow compared with the length thereof. If the camera is set to face one sidewall, it will provide an image of a limited area of the sidewall. Accordingly, the camera is set obliquely to the sidewall as shown in FIG. 5(*b*).

FIG. 6(*a*) shows an area AIF of the sidewall W1 photographed by the camera obliquely set to the sidewall, and FIG. 6(*b*) shows an image 12 of the area AIF provided by the camera. The image 12 is perspective with a narrow view in the vicinity of the camera and a wide view away from the camera. The image 12 is inconvenient to inspect the conditions of the surface of the sidewall. Accordingly, the prior art processes the perspective image 12 to form a front view of the sidewall.

In the perspective image 12, firebricks having the same size are displayed in different sizes. A firebrick close to the camera is enlarged to provide high resolution, and a firebrick away from the camera is small to provide low resolution. Zooming up the view of firebricks at an intermediate distance will deteriorate the resolution and clavity of distant firebricks and will excessively enlarge and blur near firebricks.

The prior art provides a clear image of only a focused part of the sidewall, i.e., about three or four firebricks.

A first object of the present invention is to photograph every part of the surface of a wall of a structure with high resolution and equal magnification, to clearly show irregularities on the wall.

A second object of the present invention is to photograph the surface of a wall of a coke oven and provide a high-resolution equal-magnification image of the wall, to clearly show irregularities on the wall.

Japanese Unexamined Patent Publication No. 61-114085 discloses an apparatus for monitoring the inside of a furnace, and Japanese Unexamined Patent Publication No. 63-263390 discloses a similar apparatus. Each of these disclosures turns the optical axis of a camera by about 90 degrees when photographing the walls of the furnace. The disclosure 61-114085 sets a television camera in a cooling box having a circular window. Incident light to the window is deflected by 90 degrees through a prism toward the camera. The cooling box is supported with a lever, which is moved in the furnace to photograph the walls of the furnace. The disclosure 63-263390 arranges a fiber scope in a heat insulation box having a cooling mechanism. The box has two windows that are orthogonal to each other. A rotary reflection mirror selects one of the windows, to change a view field by 90 degrees. The box is linearly moved and turned to observe an optional one of the walls of the furnace.

The prism and reflection mirror are arranged close to the camera and fiber scope and stored in the heat insulation boxes.

Each of the disclosures 61-114085, 63-263390, and 3-105195 inserts the supported camera into the coking chamber and moves the camera through the chamber to continuously photograph a wall of the chamber. When the camera is moved or turned in the chamber, mechanical vibration occurs on the camera to affect photographed images.

A third object of the present invention is to photograph every part of the walls of a structure at high resolution and equal magnification.

A fourth object of the present invention is to photograph the walls of a structure without the influence of mechanical vibration.

A fifth object of the present invention is to photograph the surface of each wall of a coke oven with high resolution and equal magnification without involving mechanical vibration.

FIG. 19(*a*) is a plan view of the coking chamber of FIG. 5(*a*). A ram 12 is driven by a beam 13 to insert the lance for measurement. A pair of non-contact distance measuring units TRL1 and TRR1 are set on the beam 13 as shown in FIG. 19(*b*). The units TRL1 and TRR1 face the sidewalls W2 and W1 and measures distances I2 and I1 to the sidewalls. The width It of the coking chamber is calculated as It=I1+I2+I0, where I0 is the width of the beam 13. This calculation is irrelevant to the positions of the units TRL1 and TRR1.

If the beam 13 shifts toward the sidewall W1, the unit TRR1 gets closer to the sidewall W1 to reduce the distance I1, and the other unit TRL1 separates away from the sidewall W2 to increase the distance I2. As a result, the total width It is unchanged. However, simply measuring the total width It is insufficient to grasp irregularities on the surfaces of the sidewalls W1 and W2.

Even if the total width It is detected to be abnormal, there is no way to determine which of the sidewalls is abnormal. There is also no way to detect whether or not the sidewalls curve in parallel with each other. Accordingly, the units TRL1 and TRR1 must separately measure distances to the sidewalls, and to do so, the fitting positions of the units TRL1 and TRR1 on the beam 13 must correctly be measured. For example, Japanese Unexamined Patent Publication No. 3-269209 installs a pair of non-contact distance sensors 13A and 13B on a beam of a coke pushing machine. The beam is inserted into a coking chamber and is moved through the chamber. At this time, the distance sensors measure distances to the sidewalls of the chamber. The distances are used to measure the profiles of the sidewalls. In addition to the distance sensors, the disclosure employs beam position sensors 14A and 14B, parallelism sensors 15A and 15B for measuring the parallelism of the coke pushing machine, and a direction sensor 16 for detecting the running direction of the coke pushing machine. These sensors are used to measure a longitudinal deviation δ of the beam 13, and the longitudinal deviation δ is used to correct the measured distances I1 and I2 to the sidewalls.

Distances y1 and y2 from a reference line to the sidewalls are calculated as y1=I1+I0/2−δ, y2=I2+I0/2+δS. These distances are displayed as side-wall profiles on a display.

Namely, this prior art detects an inclination of the beam 13 with respect to a y-axis and finds the offset δ of the center of the front end of the beam 13 with respect to an x-axis. The inclination and the offset are used to correct the measured distances to the sidewalls. The beam 13 is very long, and therefore, is deformed or curved after it is repeatedly inserted into and extracted from the red-hot coking chamber.

The prior art mentioned above is based on the assumption that the beam 13 is straight. If the beam 13 is gradually deformed, the distances to the sidewalls measured according to the prior art will be incorrect. If the beam 13 is twisted, the distance sensors will be horizontally shifted to cause errors. The prior art does not correct such errors. The prior art is complicated because it employs not only the distance sensors 13A and 13B but also the beam position sensors 14A and 14B and parallelism sensors 15A and 15B to measure the longitudinal deviation δ.

A sixth object of the present invention is to provide an apparatus for monitoring the surface of a wall of a structure, having at least one of a non-contact distance measuring unit and a photographing unit. Any one of the units is installed on a beam, which is inserted into and moved through, for example, a coking chamber of a coke oven, to monitor the sidewalls of the chamber. The present invention simply measures the front end position, horizontal deflection angle, and vertical inclination of the beam. These measurements are used to calculate the position of the unit on the beam, and the calculated position is used to correct the distance measured by the unit or the image photographed by the unit, thereby providing a correct width or profile of the coking chamber.

SUMMARY OF THE INVENTION

In order to accomplish the objects, an aspect of the present invention provides an apparatus for monitoring the surface of a wall of a structure, having linear cameras (LC2 to LC5), a y-driver (HSA), image memories (112 to 115), A/D converters (AD2 to AD5), a write unit (11A), and image providing units (11A, 10, MON, CPTR, PTR). The cameras generate image signals. The y-driver drives the cameras along a y-axis so that a linear view field (LIF) of the cameras is moved substantially in parallel with a z-axis and so that optical axes of the cameras cross a sidewall (W1) at an angle of θ that is smaller than 90 degrees. The sidewall is substantially in parallel with a y-z plane. The A/D converters convert the image signals having a z-axis distribution into digital image data. The write unit writes the digital image data into the image memories whenever the cameras are moved for a predetermined short distance along the y-axis, to store two-dimensional image data having a y-z distribution in the image memories. The image providing units provide two-dimensional images on output units (DISP, PTR) according to the image data read out of the image memories. The parenthesized reference marks mentioned above correspond to the reference marks shown in the accompanying drawings.

The cameras (LC2 to LC5) photograph the sidewall (W1) with the linear view field (LIF) that is substantially in parallel with the z-axis. The optical axes of the cameras cross the sidewall, which is in parallel with the y-z plane, at an angle θ that is smaller than 90 degrees. As a result, an image based on the linear view field correctly shows irregularities on the sidewall.

The y-driver (HSA) drives the cameras (LC2 to LC5) along the y-axis that is orthogonal to the length of the linear view field (LIF). The write unit (11A) writes image data into the image memories (112 to 115) whenever the cameras are moved for a predetermined short distance. The image data stored in the memories has a y-z distribution. Namely, the image data is defined by y-and z-coordinates.

The image data is read out of the image memories and is displayed on a display or printed on a printer with the y-axis of the image data serving as a horizontal scan axis and the z-axis thereof serving as a vertical scan axis. While the cameras are photographing the sidewall, the focal distances of the cameras and the distances between the cameras and the sidewall are substantially constant. Accordingly, the displayed or printed image has uniform resolution and magnification as if it is a front view of the sidewall. The displayed or printed image is actually a y-axis combination of linear images each extending along the z-axis. Each of the linear images is formed by a shot of the cameras from the front view of the sidewall and contains information about irregularities on the surface of the sidewall.

The displayed or printed image is used to inspect the surface conditions of the sidewall. For example, breakage, deformation, and joint conditions of firebricks of the sidewall can be observed on the image. If any part of the sidewall has irregularities due to flaking or carbide adhesion, the part will be blurred or uneven on the image, and therefore, will easily be identified. Consequently, the present invention realizes the correct and reliable monitoring of the surface of a wall of a structure.

Another aspect of the present invention provides an apparatus for monitoring the surface of a wall of a structure, having linear cameras (LC2 to LC5), a reflection mirror (MIR2), a y-driver (HSA), image memories (112 to 115), A/D converters (AD2 to AD5), a write unit (11A), and image providing units (11A, 10, MON, CPTR, PTR). The cameras generate image signals. The mirror is arranged in front of the cameras, to deflect the optical axes of the cameras by about 90 degrees toward a target wall. The y-driver drives the cameras along a y-axis so that a linear view field (LIF) of the cameras is substantially in parallel with a z-axis and so that the cameras photograph an image of the surface of a sidewall (W1), which is substantially in parallel with a y-z plane, reflected on the mirror. The A/D converters convert the image signals having a z-axis distribution into digital image data. The write unit writes the image data into the image memories whenever the cameras are moved for a predetermined short distance along the y-axis, to store image data having a y-z distribution in the image memories. The image providing units provide a two-dimensional image on output units (DISP, PTR) according to the image data read out of the image memories.

The cameras (LC2 to LC5) photograph the sidewall (W1) with the linear view field (LIF) that is substantially in parallel with the z-axis. The y-driver (HSA) drives the cameras (LC2 to LC5) along the y-axis that is orthogonal to the length of the linear view field (LIF). The write unit (11A) stores image data in the image memories (112 to 115) whenever the cameras are moved for a predetermined short distance. The image data in the image memories has a y-z distribution, and therefore, is defined by y- and z-coordinates. The image data is read out of the image memories and is displayed on a display or printed on a printer with the y-axis of the image data serving as a horizontal scan axis and the z-axis thereof serving as a vertical scan axis. While the cameras are photographing the sidewall, the focal distances of the cameras and the distances between the cameras and the sidewall are substantially constant. Accordingly, the displayed or printed image has uniform resolution and magnification as if it is a front view of the sidewall. The displayed or printed image is two dimentionally a y-axis combination of linear images each extending along the z-axis. Each of the linear images is formed by a shot of the cameras from the front view of the sidewall and contains information about irregularities on the surface of the sidewall.

The displayed or printed image is used to inspect the surface conditions of the sidewall. For example, breakage, deformation, and joint conditions of firebricks of the sidewall can be observed on the image.

The width of the coking chamber is narrow, and therefore, it is difficult to face the cameras to the sidewall. Accordingly, the cameras are obliquely arranged with respect to the sidewall. FIG. 10 shows a camera LC2 whose optical axis L1 forms an acute angle with respect to a sidewall W1. If the camera is moved by 0.56 mm along the x-axis, it will cause a shift of 2.1 mm along the y-axis. Namely, an x-axis shift of the camera causes a y-axis dislocation between points P2 and P1 or 31 as shown in FIG. 10(*b*). To solve this problem, the present invention uses a mirror (MIR2) to deflect the optical axis (L1) of the camera (LC2) by about 90 degrees into the x-axis direction when photographing the sidewall (W1). Even if an optical axis M1 of the camera LC2 shifts to M2 or M3 as shown in FIG. 10(*b*), the photographing point P2 on the y-axis is unchanged, thereby providing a correct image.

Still another aspect of the present invention provides an apparatus for monitoring the surface of a wall of a coke oven, having distance measuring units (TRL1 to TRL3, TRR1 to TRR3) for measuring distances to the wall, and/or a photographing unit for photographing the wall. A lance (201) supports the distance measuring units and/or the photographing unit. A driver (LFIX, LDRV) drives the lance into and out of the coke oven along a y-axis. The lance has a heat resisting string (207) that extends from a front end (208F) toward a rear end (208A) of the lance. The string is longitudinally tensioned with a tensioner (209). A pair of detectors (205, 206) are arranged at the rear end of the lance. The detectors are away from each other on the y-axis, to detect a horizontal deflection angle θ of the string from a reference line that is along the y-axis.

A unit (LPOS) measures the position of the lance on the y-axis. A unit (CPT) calculates an x-axis position of the front end (208F) of the lance according to the deflection angle θ and the position measured by the unit LPOS.

An inclination measuring unit measures an inclination angle φ of the front end of the lance with respect to a y-z plane. The calculation unit (CPT) calculates x-axis positions of the distance measuring units (TRL1 to TRL3, TRR1 to TRR3) according to the deflection angle θ, the y-axis position, and the inclination angle φ.

In this way, the detectors (205, 206) detect the horizontal deflection angle θ of the string (207) with respect to the reference line that extends along the y-axis. According to the known length (L) of the string, the deflection angle θ, and the y-axis position of the lance, the calculation unit (CPT) calculates the absolute positions (x, y, z) of the front end of the string with respect to a reference point having known coordinates.

If the front end (208F) of the lance is inclined with respect to the y-z plane, the positions of the distance measuring units (TRL1 to TRL3, TRR1 to TRR3) shift along the x-axis, to change distances to the sidewall (W1). Accordingly, the positional changes in the distance measuring units must be found to correct the distances to the sidewall. The inclination angle φ of the front end of the lance is measured by the inclination measuring unit (211). According to relationships between the front end position of the string and the positions of the distance measuring units, the calculation unit (CPT) calculates the correct x- and y-axis positions of the distance measuring units.

Even if the lance deforms to have the deflection angle θ and inclination angle φ, the present invention finds the front end position of the string and the positions of the distance measuring units, to correct the distances measured to the sidewall. The present invention also corrects a position for photographing the sidewall, to provide correct profiles of the sidewall.

BRIEF DESCRIPTION OF THE DRAWINGS

Other objects and features of the present invention will be described hereinafter in detail by way of preferred embodiments with reference to the accompanying drawings, in which:

FIG. 1(*b*) is a sectional view showing a photographing head SHD according to an embodiment of the present invention;

FIG. 3(*b*) is a front view showing an image analyzing computer CPTR and a printer PTR connected to a host computer (MON, 10) of FIG. 3(*a*);

FIG. 5(*b*) is a plan view showing an ITV camera of a prior art for photographing a sidewall of the coking chamber of FIG. 5(*a*);

FIG. 6(*b*) is a plan view showing an image corresponding to the area AIF provided by the ITV camera of FIG. 5(*b*);

FIG. 7(*b*) is a plan view showing a technique of photographing the ceiling and floor of a coking chamber with a reflection mirror and linear cameras;

FIG. 7(*c*) is a sectional view showing a photographing head SHA and reflection mirrors according to an embodiment of the present invention;

FIG. 8(*b*) is a sectional view showing a reflection mirror for a floor;

FIG. 8(*c*) is a sectional view showing a reflection mirror for sidewalls;

FIG. 8(*d*) is a sectional view showing a mirror having a different shape;

FIG. 9(*b*) shows a two-dimensional image of the sidewall photographed with the arrangement of FIG. 9(*a*);

FIG. 10(*b*) is a plan view showing the influence of x-axis vibration on the arrangement of FIG. 10(*a*);

FIG. 10(*c*) is a plan view showing the influence of y-axis vibration on the arrangement of FIG. 10(*a*);

FIG. 11(*b*) is a sectional view showing the influence of z-axis vibration on the arrangement of FIG. 11(*a*);

FIG. 11(*c*) is a sectional view showing the influence of y-axis vibration on the arrangement of FIG. 11(*a*);

FIG. 12(*b*) is a general view showing an apparatus for monitoring the surface of a wall of a coke oven;

FIG. 13(*b*) shows a lance horizontally curved;

FIG. 13(*c*) is an enlarged plan view showing deflection measuring units using the string;

FIG. 14(*b*) is an enlarged plan view showing the lance front end 208F horizontally deflected from a y-z plane;

FIG. 15(*b*) is a sectional view taken along a line A—A of FIG. 15(*a*), showing the inclined lance front end 208F;

FIG. 17(*b*) is a sectional view taken along a line A—A of FIG. 17(*a*), showing the inclined lance front end 208F;

FIG. 18(*b*) is an enlarged plan view showing inclination measuring units 203 and 204 using the two strings;

FIG. 19(*b*) is a sectional view showing a ram beam inserted into the coking chamber and non-contact distance measuring units installed on the ram beam.

DESCRIPTION OF THE PREFERRED EMBODIMENTS

An apparatus for monitoring the surface of a wall of a structure according to an embodiment of the present invention will be explained with reference to FIGS. 1 to 4. The apparatus photographs the sidewalls W1 and W2, ceiling CL, and floor FL of a coking chamber of a coke oven. In the following explanation, the width of the coking chamber corresponds to an x-axis, the depth or length thereof to a y-axis, and the height thereof to a z-axis.

Figure 1A:
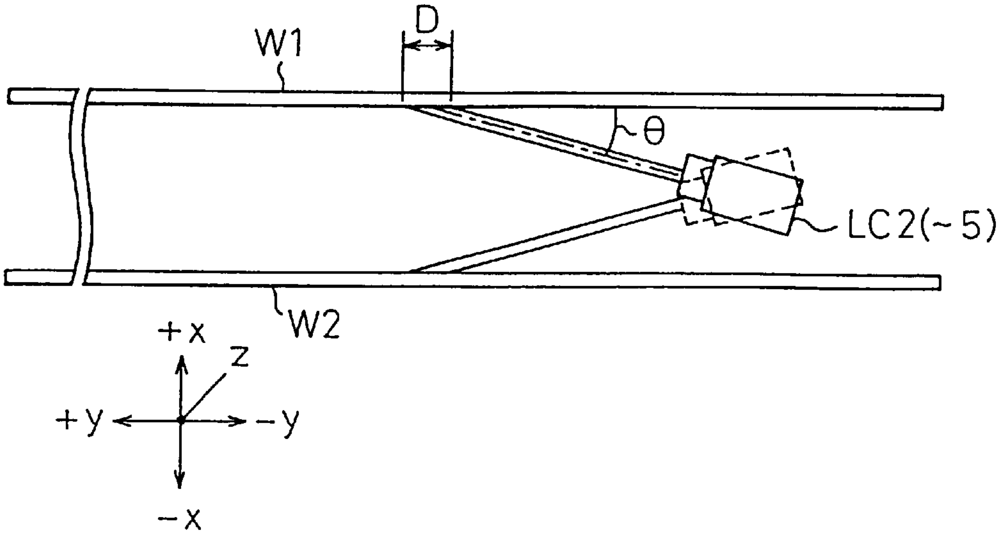
FIG. 1(*a*) is a plan view showing a linear CCD camera LC2 that is obliquely photographing a right sidewall.
Figure 1B:
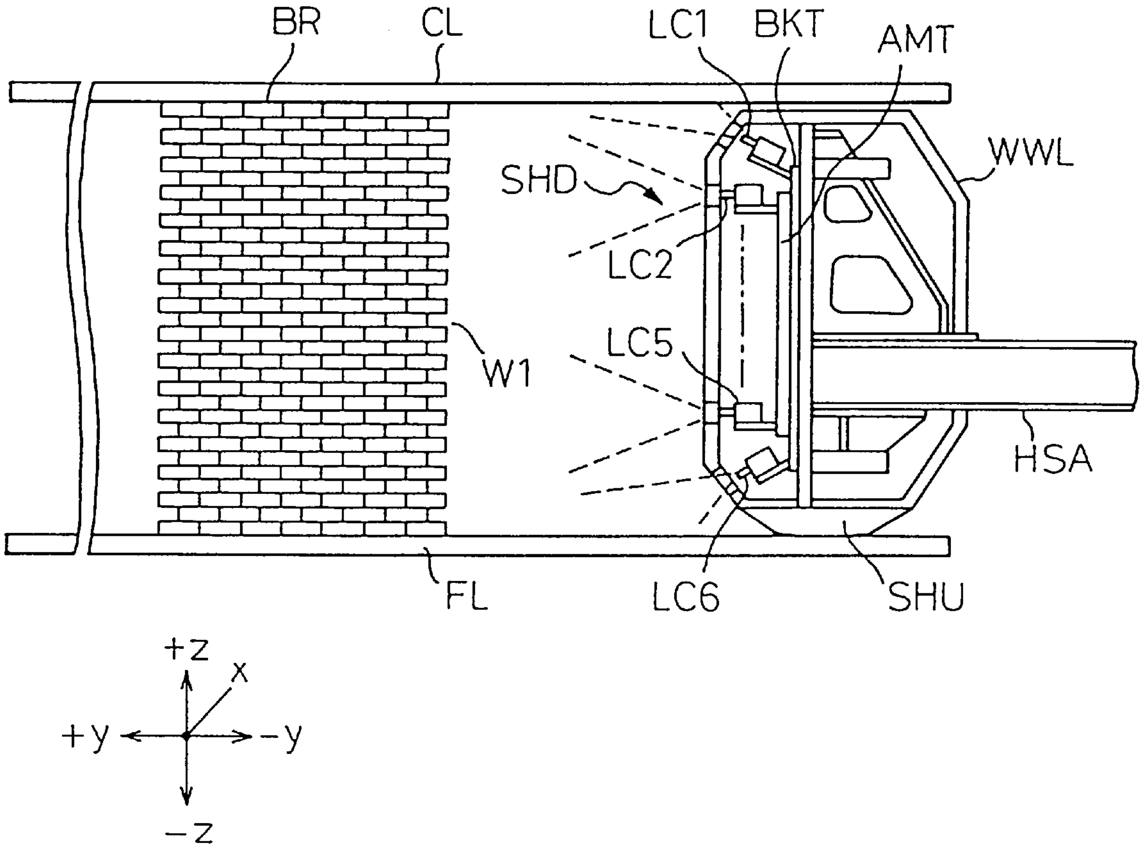
Figure 2:
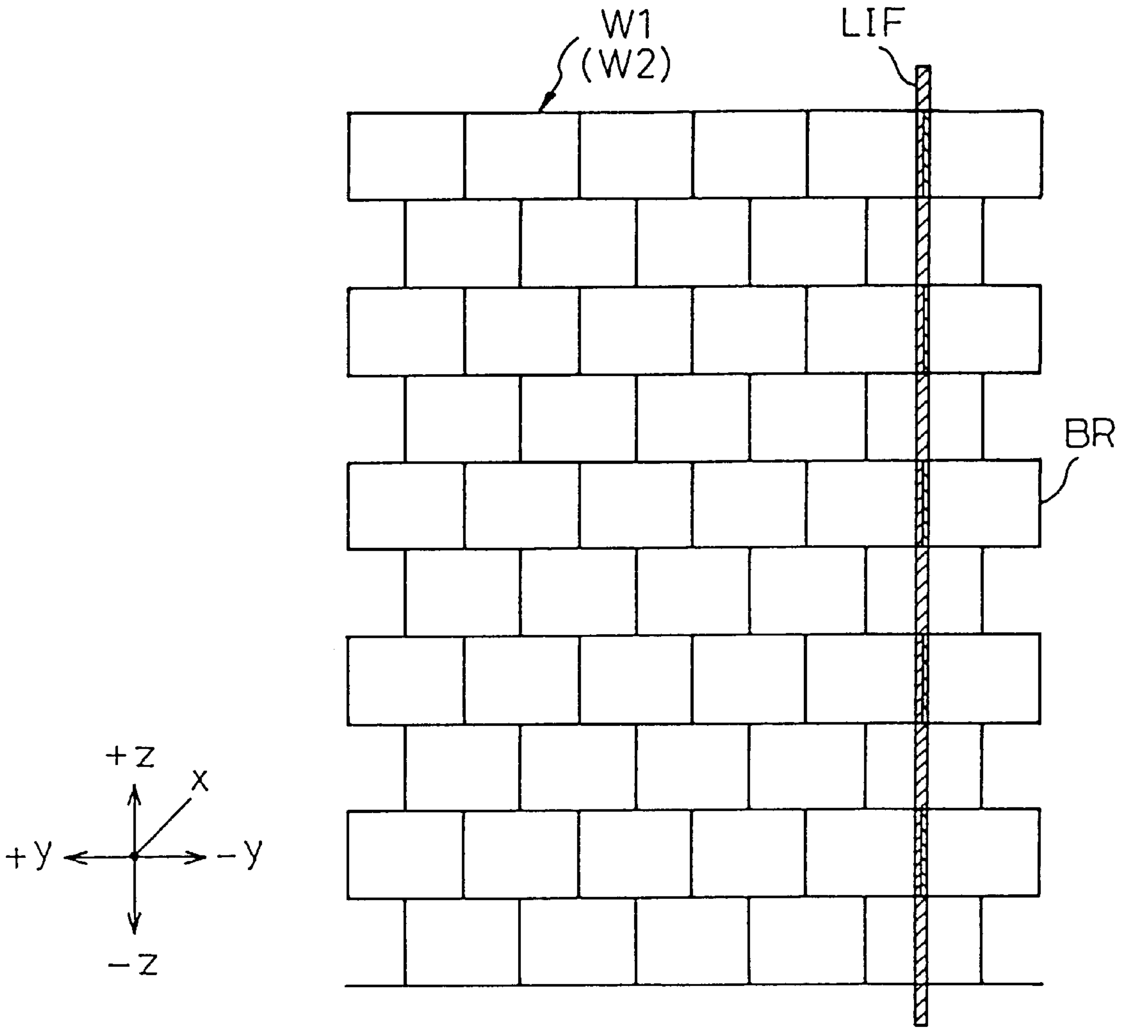
FIG. 2 is a plan view showing a part of a right sidewall W1 of a coking chamber of a coke oven and a linear view field LIF of the CCD camera LC2 of FIG. 1(*a*)

The apparatus has linear CCD cameras LC2 to LC5 for photographing the sidewalls W1 and W2. FIG. 1(*a*) shows one (LC2) of the cameras attached to a photographing head SHD such that an optical axis of the camera forms a horizontal angle e with respect to the sidewall W1, to obliquely photograph the sidewall W1. The angle θ is in the range of 10 to 20 degrees. If it is less than 10 degrees, the camera will provide a blurred image, and if it is larger than 20 degrees, the camera will photograph only a limited area of the sidewall. According to the embodiment, the angle θ is 15 degrees.

Each camera has a focal length of 24 mm to realize a wide range. If the focal length is shorter than 24 mm, an image will be distorted. Each camera is a linear CCD camera, and the cameras LC2 to LC5 provide a resolution of 2048 pixels per line to photographing a line of the sidewall W1 along the z-axis.

A linear CCD camera LC1 is to photograph the ceiling of the coking chamber and is attached to the head SHD so that the optical axis thereof inclines at 15 degrees with respect to the ceiling. A linear CCD camera LC6 is to photograph the floor of the coking chamber and is attached to the head SHD so that the optical axis thereof inclines at 15 degrees with respect to the floor. The cameras LC1 to LC6 are identical to one another.

The photographing width, i.e., lateral resolution of each photoelectric converter (pixel) of each camera is 2.1 mm. The photographing range of each camera along the z-axis corresponds to 10 firebricks of the wall.

To provide a two-dimensional image of the inside of the coking chamber, the cameras are moved along the y-axis. In FIG. 1(*b*), the head SHD is attached to a front end of an arm HSA, which may be of a coke pushing machine or lance. The arm HSA is driven between an inlet and an exit of the coking chamber. The head SHD is covered with a double-wall for passing cooling water. The double-wall has windows made of heat resisting glass, to face the objective lenses of the cameras LC1 to LC6. The periphery of each window is provided with gas purge heads (not shown) to jet gas for purging dust from the window. The bottom of the head SHD has a shoe SHU to slide on the floor of the coking chamber.

The arm HSA is supported by a carriage, which drives the arm HSA into and out of the coking chamber along the y-axis. The carriage has a reciprocator, which provides a start signal, a reverse signal, and a y-synchronous signal in response to the motion of the arm HSA. Each pulse of the y-synchronous signal corresponds to a 1-mm forward or backward movement of the arm HSA. Image signals from the cameras are sampled in response to the y-synchronous signal. Namely, image signals for one line are sampled whenever the cameras are moved one millimeter along the y-axis.

Figure 3A:
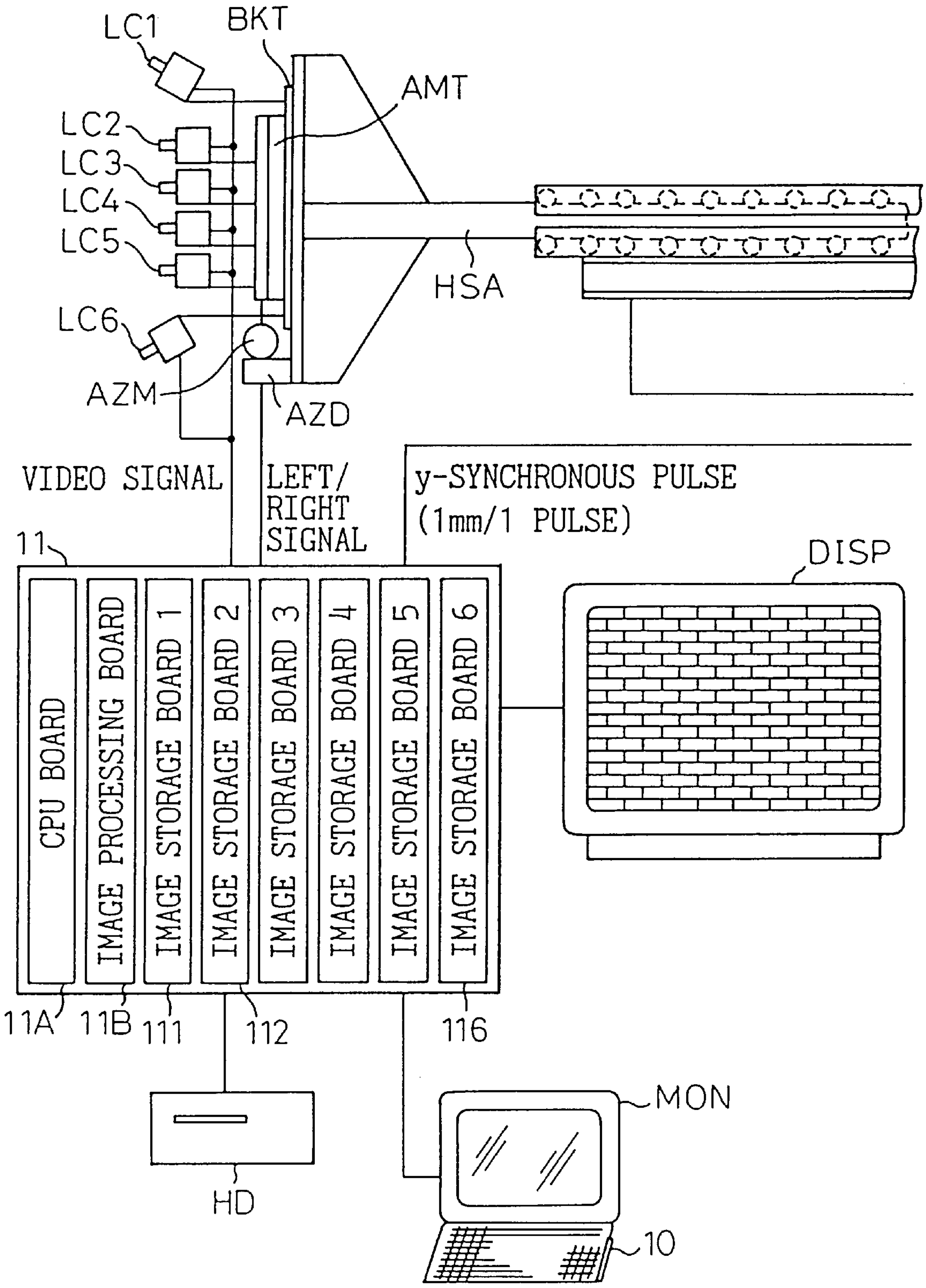
FIG. 3(*a*) is a block diagram showing an image storage unit 11 connected to CCD cameras LC1 to LC6 of FIG. 1(*b*)
Figure 3B:
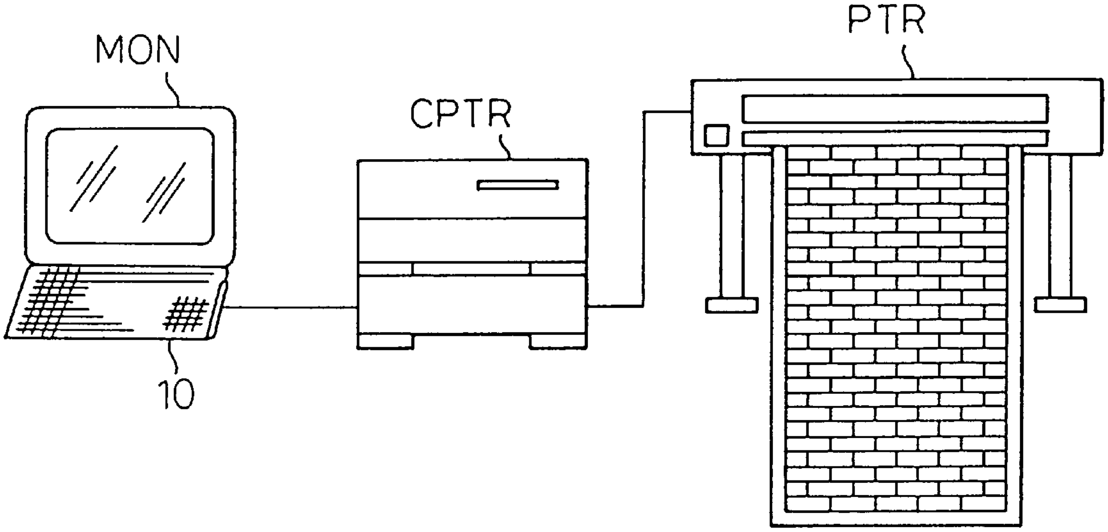

To photograph the sidewalls W1 and W2, the cameras LC2 to LC5 must be turned from one side to another. This embodiment photographs the sidewall W1 while advancing the cameras from the inlet to the exit of the coking chamber, and the sidewall W2 while retracting them from the exit to the inlet. For this purpose, the cameras LC2 to LC5 are attached to a rotary mount AMT, which is attached to a rotary mechanism, as shown in FIG. 3(*a*). The rotary mechanism is attached to a bracket BKT. The rotary mount AMT is turned by a motor AZM, so that the optical axes of the cameras LC2 to LC5 form 15 degrees with respect to any one of the sidewalls W1 and W2.

The cameras photograph the coking chamber after the coke pushing machine discharges produced coke out of the chamber. At this time, the temperature of the walls of the chamber is 900 to 1100 degrees centigrade, and therefore, firebricks of the walls are red-hot or white-hot. To protect the head SHD from the high temperatures and radiation, the double-wall WWL passes cooling water at high speed. No photographing light is needed because the walls are red-hot.

FIG. 3(*a*) shows an image storage unit 11 connected to the cameras LC1 to LC6.

The image storage unit 11 has image storage boards 111 to 116 having RAMs for storing linear images provided by the cameras LC1 to LC6, respectively. These images are individually or collectively displayed on a display DISP, and if required, are stored in a hard disk HD or magneto-optical disk for an analysis purpose. A host computer has a keyboard 10 and a display MON and is connected to an image analyzing computer CPTR of FIG. 3(*b*). The computer CPTR processes image data and provides a hard copy on a printer PTR. The host computer controls the image storage unit 11.

The image storage unit 11 has a CPU board 11A containing a CPU serving as a controller. The CPU receives the start and end addresses of a line of an image for each of the cameras LC1 to LC6. The CPU board 11A stores these addresses for the boards 111 to 116. The reciprocator (not shown) provides the CPU with a start signal when the arm HSA is driven along the y-axis, a y-synchronous signal involving pulses each corresponding to a 1-mm movement of the arm HSA, and a reverse signal when the moving direction of the arm HSA is reversed. Upon receiving the start signal, the CPU provides an image processing board 11B with the start and end addresses of each camera as well as a write instruction. The image processing board 11B latches these addresses and instruction and clears x-, y-, and z-address counters. At the same time, the CPU initializes the display DISP to display an image from the camera LC1.

The image processing board 11B monitors the y-synchronous signal, and whenever it detects a pulse in the signal, increments the y-address counter by one. For the cameras LC1 to LC6, the image processing board 11B counts the number of pixels in response to a line synchronous signal, and when the count reaches the sampling start address of a given camera, carries out A/D conversion on image signals provided by the camera until the sampling end address set for the camera is counted. The converted image signals are stored in the respective boards 111 to 116 at addresses corresponding to the counts of the y-address counter and pixel counter. These processes are repeated in response to the pulses of the y-synchronous signal.

When the optical axis of the camera LC1 reaches the inlet of the coking chamber due to the y-axis movement of the head SHD, the display DISP shows the ceiling of the inlet. An operator recognizes the ceiling on the display and enters a start instruction through the keyboard 10. This operation is not always necessary. The host computer transfers the instruction to the CPU board 11A, which carries out the same tasks to be carried out in response to the start signal from the reciprocator. At this time, all image data stored in the storage boards 111 to 116 are cleared, and new image data are written therein.

Figure 4:
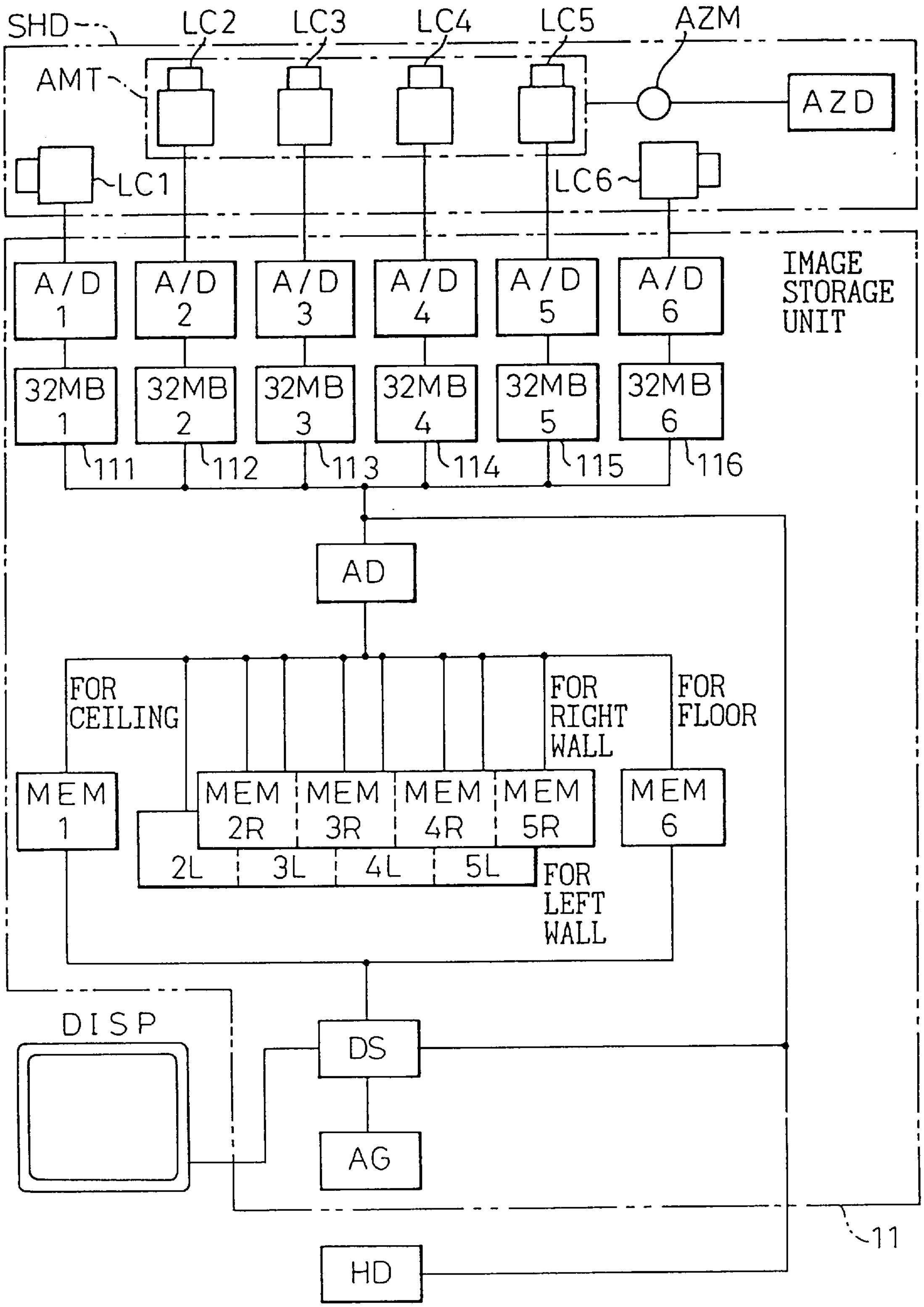
FIG. 4 is a block diagram showing functional elements of the image storage unit 11 of FIG. 3(*a*)
Figure 5A:
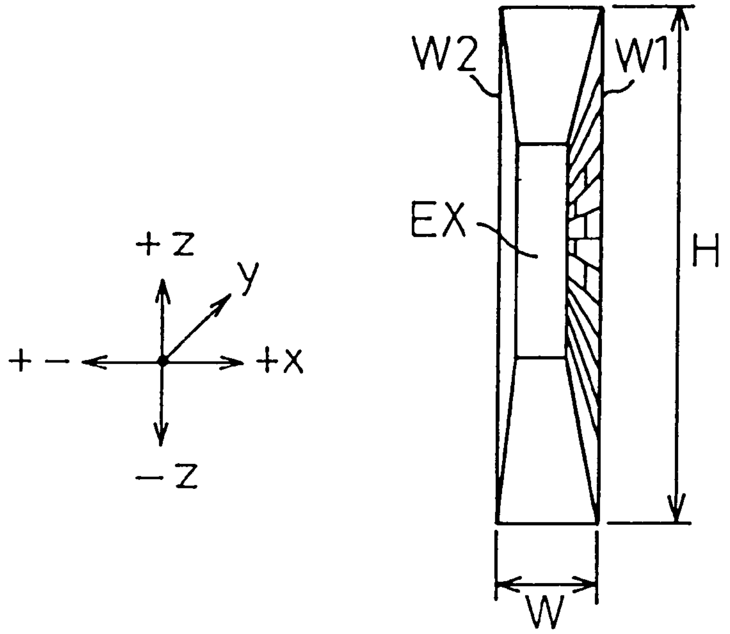
FIG. 5(*a*) is a perspective view showing an inlet to an exit of a coking chamber of a coke oven.
Figure 5B:
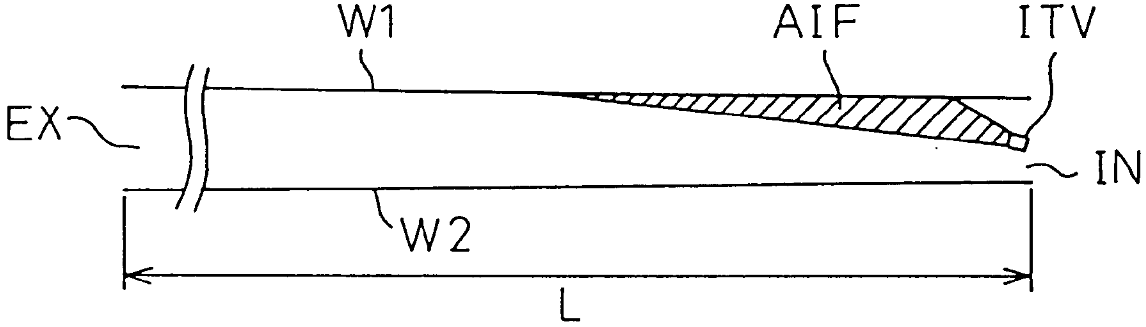
Figure 6A:
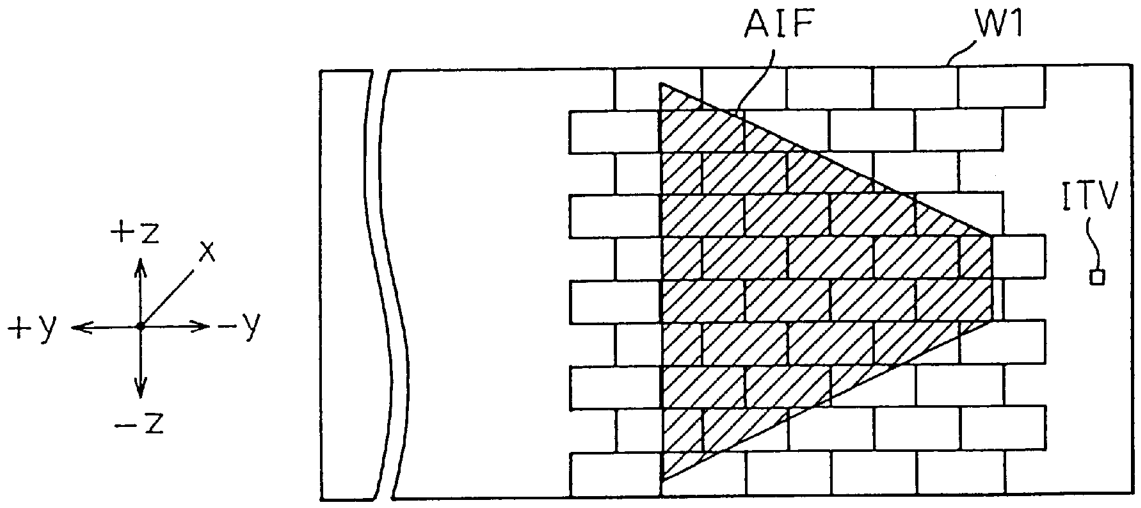
FIG. 6(*a*) is a front view showing an area AIF of the sidewall photographed by the ITV camera of FIG. 5(*b*)
Figure 6B:
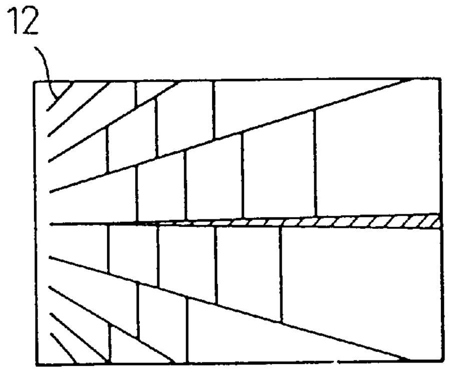

FIG. 4 shows functional elements of the image storage unit 11. All functional elements of FIG. 4 except those for the boards 111 to 116 are of the image processing board 11B.

When the view fields of the cameras LC1 to LC6 come out of the exit of the coking chamber, the reciprocator reverses the y-axis direction of the arm HSA and provides the CPU of the CPU board 11A with a reverse signal. In response to the reverse signal, the CPU provides the image processing board 11B with a stop instruction and a motor driver AZD with a turn instruction. In response to the instruction, the image processing board 11B stops writing image data into the boards 111 to 116 and saves the count of the y-address counter representing the y-distance from the inlet to the exit of the coking chamber in a reversing position register. The mount AMT is turned so that the optical axes of the cameras LC2 to LC5 turn from the sidewall W1 to the sidewall W2 and form an angle of 15 degrees with respect to the sidewall W2.

In response to a turn completion signal from the motor driver AZD, the CPU instructs the image processing board 11B to resume writing image data only for the cameras LC2 to LC5. At the same time, the y-address counter is decremented from "$Y\times2+\alpha$" where Y is the value stored in the reversing position register and $\alpha$ is a play. Then, the image processing board 11B starts to write image data from the cameras LC2 to LC5 into the corresponding storage boards. At first, the image processing board 11B sets the y-address counter to "$Y\times2+\alpha$" and decrements it by one whenever it detects a pulse in the y-synchronous signal.

Upon observing that the view field of the camera LC1 comes out of the inlet of the coking chamber, the operator enters a stop instruction through the keyboard 10. Alternatively, the reciprocator stops the arm HSA as soon as it detects that the arm HSA has reached a standby position out of the coking chamber. Then, the reciprocator provides the CPU of the CPU board 11A with a stop signal. The CPU provides the image processing board 11B with a stop instruction and displays a completion message on the display MON. In response to the stop instruction, the image processing board 11B stops writing image data into the storage boards and transfers the value in the reversing position register as well as the value in the y-address counter (the remnant counted down from "Y×2+α") to the CPU, which displays these pieces of data on the display MON.

As a result, the storage board 111 stores image data of the ceiling photographed by the camera LC1. The storage boards 112 to 115 store image data of the sidewalls W1 and W2 photographed by the cameras LC2 to LC5. More precisely, the boards 112 to 115 store the image of the sidewall W1 in an area defined by the first y-address and the address stored in the reversing position register, as well as the image of the sidewall W2 in an area defined by the counted-down remnant and "Y×2+α." The storage board 116 stores image data of the floor photographed by the camera LC6. These data pieces are sequentially arranged from one for the inlet to one for the exit of the coking chamber.

The image storage boards 111 to 116 correspond to the cameras LC1 to LC6, respectively. The image processing board 11B converts an analog image signal provided by each camera into an 8-bit digital image signal, which is stored in a corresponding one of the boards 111 to 116.

The display DISP of this embodiment has a resolution of 1280×1024 pixels. A data compressor AD (FIG. 4) of the image processing board 11B is a memory selector for preparing image data suitable for the display resolution. The prepared image data is stored in display memories MEM1 for the ceiling, MEM2R to MEM5R for the right sidewall, MEM2L to MEM5L for the left sidewall, and MEM6 for the floor.

A display selection memory DS of the image processing board 11B is of 1000×1000 cells in size into which the image data stored in an optional one of the display memories MEM1 to MEM6 is selectively written. Each of the images of the right and left sidewalls may be selected camera by camera (any one of the cameras LC2 to LC5), or as a whole image, i.e., a combination of the four images provided by the cameras LC2 to LC5. In the case of the whole image, the image data is compressed to ¼ because the data quantity of the whole image is too large compared with the screen size of the display DISP.

Images to be displayed on the display DISP may be still images to be displayed one by one, or a waterfall of images to be displayed successively. When displaying a waterfall of images, a memory controller AG of the image processing board 11B reads image data from the boards 111 to 116 and updates the memories DS and MEM1 to MEM6.

The image data memory HD stores the image data provided by the cameras and the image data on the display. The memory HD may be a hard disk or a magneto-optic disk.

The image analyzing computer CPTR processes images, to clearly show abnormal parts and edges on the walls. The processed images are printed on the printer PTR. This image processing function may be incorporated in the image processing board 11B, or a separate image processing board for the function may be incorporated in the image storage unit 11.

Instead of turning the cameras LC2 to LC5 to photograph the left and right sidewalls, two sets of cameras may be installed for the left and right sidewalls, respectively, and the turning mechanism may be omitted. The number of cameras is not limited to six but is properly adjusted according to an area to photograph.

An apparatus for monitoring the surface of a wall of a structure according to another embodiment of the present invention will be explained with reference to FIGS. 3, 4, and 7 to 9. The apparatus photographs the sidewalls, ceiling, and floor of a coking chamber of a coke oven.

Figure 7A:
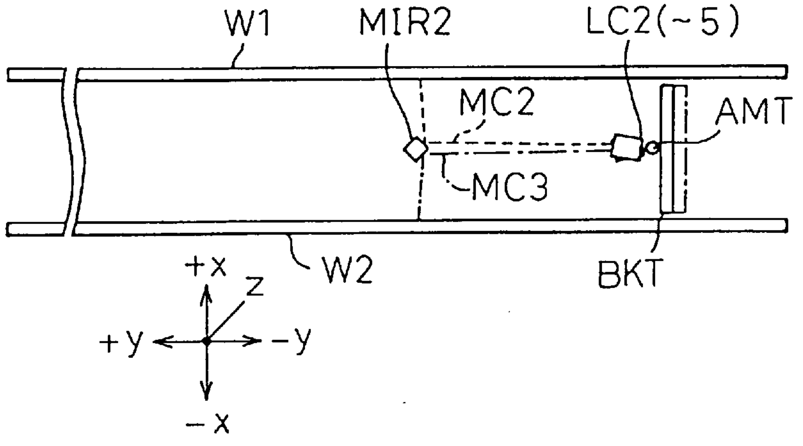
FIG. 7(*a*) is a plan view showing a technique of photographing the sidewalls of a coking chamber with a reflection mirror and linear cameras.
Figure 7B:
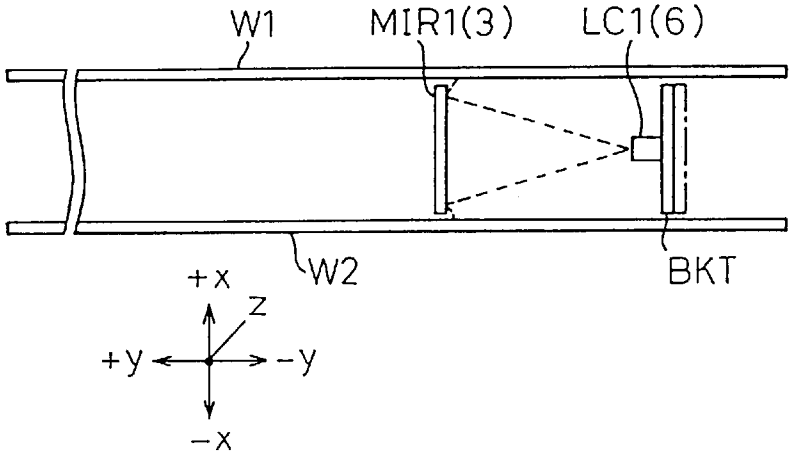
Figure 7C:
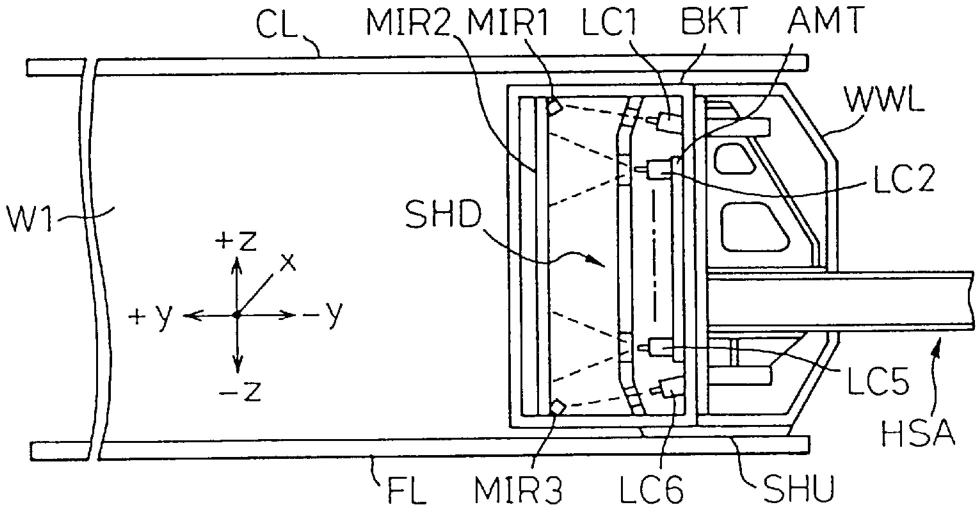
Figure 8A:
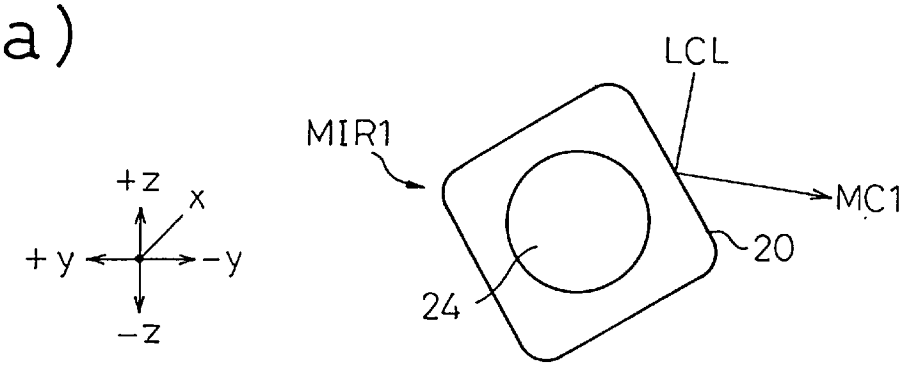
FIG. 8(*a*) is a sectional view showing a reflection mirror for a ceiling.
Figure 8B:
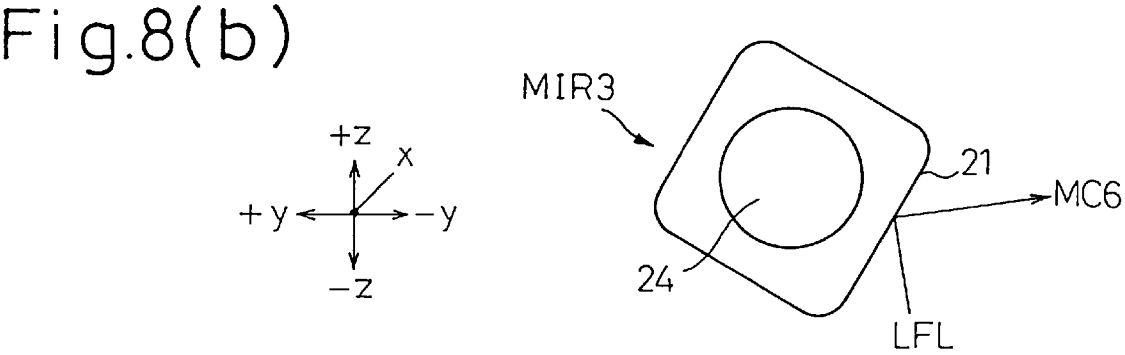
Figure 8C:
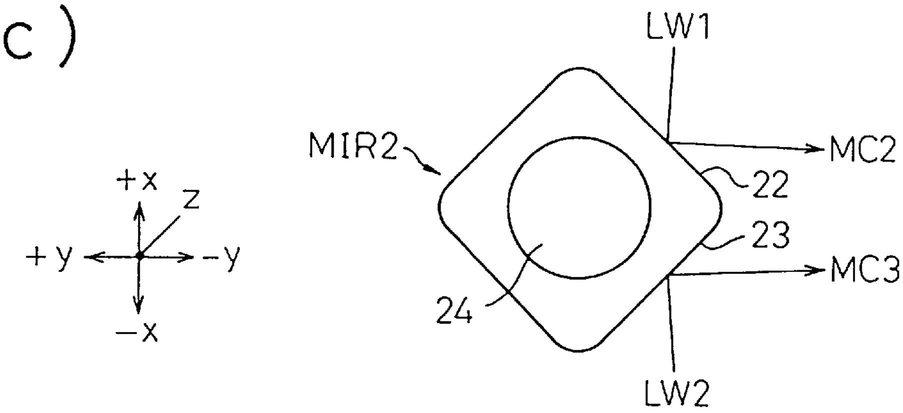
Figure 8D:
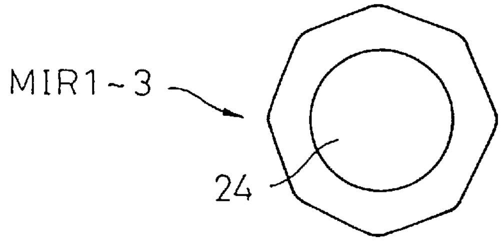

FIG. 7(*c*) shows an arrangement of cameras and reflection mirrors to entirely photograph the inside of the coking chamber. The reflection mirror MIR2 and linear cameras LC2 to LC5 shown in FIG. 7(*a*) are used to photograph the sidewalls W1 and W2. The mirror MIR2 extends in parallel with the z-axis. A reflection surface 22 (FIG. 8(*c*)) of the mirror MIR2 is oriented toward the cameras LS2 to LC5, which are arranged at the center of the width of the coking chamber. An optical axis MC2 of each camera is oriented toward the center of the mirror surface 22, to photograph a reflected image of the sidewall W1. The cameras are turned by a motor AZM, to have an optical axis MC3. In this case, the cameras LC2 to LC5 photograph the sidewall W2 reflected on a surface 23 of the mirror MIR2.

FIG. 7(*b*) shows reflection mirrors MIR1 and MIR3 and linear cameras LC1 and LC6 for photographing the ceiling and floor of the coking chamber. The mirror MIR1 extends along the x-axis and has a reflection surface 20 oriented toward the camera LC1. The camera LC1 is arranged at the center of the width of the coking chamber and has an optical axis MC1 oriented toward the center of the mirror surface 20 at an elevation angle of about 15 degrees. The camera LC1 photographs the ceiling CL reflected on the mirror surface 20. The mirror MIR3 extends in parallel with the x-axis and has a reflection surface 21 oriented toward the camera LC6. The camera LC6 is arranged at the center of the width of the coking chamber and has an optical axis MC6 oriented toward the center of the mirror surface 21 at a depression angle of about 15 degrees. The camera LC6 photographs the floor FL reflected on the mirror surface 21. The mirrors MIR1 to MIR3 and cameras LC1 and LC6 are attached to a bracket BKT. The cameras LC2 to LC5 are attached to a rotary mount AMT, which is attached to the bracket BKT. The bracket BKT is attached to a head SHD.

The mirror MIR1 of FIG. 8(*a*) for the ceiling has the reflection surface 20 that is inclined by about 30 degrees with respect to an x-z plane. Light LCL from the ceiling CL is reflected by the mirror surface 20 toward the camera LC1 along the optical axis MC1. The mirror MIR3 of FIG. 8(*b*) for the floor LF has the reflection surface 21 that is inclined by about 330 degrees with respect to the x-z plane. Light LFL from the floor FL is reflected by the mirror surface 21 toward the camera LC6 along the optical axis MC6.

The mirror MIR2 of FIG. 8(*c*) for the sidewalls W1 and W2 has the reflection surfaces 22 and 23 that are inclined by 45 and 315 degrees with respect to a y-z plane. Light LW1 from the sidewall W1 is reflected by the mirror surface 22 toward the cameras LC2 to LC5 along the optical axis MC2. Light LW2 from the sidewall W2 is reflected by the mirror surface 23 toward the cameras LC2 to LC5 along the optical axis MC3. One of the optical axes MC2 and MC3 is selected by turning the cameras LC2 to LC5 by the motor AZM, to photograph a corresponding one of the sidewalls W1 and W2 through the fixed mirror MIR2.

The lenses of the cameras LC2 to LC5 have a focal length of, for example, 24 mm to realize a wide photographing range. If the focal length is shorter than this, photographed images will be distorted. The cameras LC2 to LC5 are linear CCD cameras. A line of the cameras LC2 to LC5 includes 2048 pixels to scan and photograph the sidewalls W1 and W2 along the z-axis. The cameras LC1 to LC6 are separate from the mirrors MIR1 to MIR3 by about 70 cm. The cameras are attached to the bracket BKT, which is attached to the head SHD. The cameras LC2 to LC5 can each photograph 10 firebricks of one of the sidewalls W1 and W2 along the z-axis.

To provide a two-dimensional image of the inside of the coking chamber, the mirrors MIR1 to MIR3 and cameras LC1 to LC6 are moved along the y-axis. In FIG. 7(*c*), the head SHD that supports the mirrors and cameras is attached to an arm HSA. The arm HSA is driven between an inlet and an exit of the coking chamber. The head SHD is covered with a double-wall for passing cooling water.

The double-wall has windows made of heat resisting glass. The windows face the objective lenses of the cameras LC1 to LC6. The periphery of each window is provided with gas purge heads (not shown) to jet gas for purging dust from the window.

The bottom of the head SHD has a shoe SHU to slide on the floor of the coking chamber. The arm HSA is supported by a carriage, which drives the arm HSA into and out of the coking chamber along the y-axis. The carriage has a reciprocator, which provides a start signal, a reverse signal, and a y-synchronous signal in response to the motion of the arm HSA. Each pulse of the y-synchronous signal corresponds to a 1-mm forward or backward movement of the arm HSA. Each of the cameras LC1 to LC6 provides an image signal according to the y-synchronous signal. Namely, image signals for one line are sampled whenever the cameras are moved for one millimeter along the y-axis.

To photograph the sidewalls W1 and W2, the cameras LC2 to LC5 must be turned from one side to another. This embodiment photographs the sidewall W1 while advancing the cameras from the inlet to the exit of the coking chamber, and the sidewall W2 while retracting them from the exit to the inlet. For this purpose, the cameras LC2 to LC5 are attached to the rotary mount AMT, which is attached to the bracket BKT. The rotary mount AMT is turned by the motor AZM, to change the optical axis MC2 of the cameras for the sidewall W1 and the optical axis MC3 thereof for the sidewall W2 from one to another.

The cameras photograph the coking chamber after the coke pushing machine discharges produced coke out of the chamber. At this time, the temperature of the walls of the chamber is 900 to 1100 degrees centigrade, and therefore, firebricks of the walls are red-hot or white-hot. To deal with the high temperatures and radiation, the mirrors MIR1 and MIR3 are provided with a cooling mechanism, the head SHD is provided with the cooling wall WWL, and signal and control lines are contained in a cooling casing. No photographing light is needed because the walls are red-hot.

Returning to FIGS. 8(*a*) to 8(*c*), the mirrors MIR1 to MIR3 are each a axisymmetrical quadrangle metal pillar. Each surface of each mirror is mirror-finished. Each mirror has a path 24 for passing cooling water to avoid thermal distortion. Accordingly, the mirrors are usable under high temperatures without cooling boxes. The mirrors may have an octagonal cross section as shown in FIG. 8(*d*).

FIG. 8(*c*) shows the mirror MIR2. Light LW1 from the right sidewall W1 is reflected by the mirror surface 22 toward the cameras LC2 to LC5. Light LW2 from the left sidewall W2 is reflected by the mirror surface 23 toward the same cameras. The cameras are turned to adjust their optical axes to one of the mirror surfaces 22 and 23.

The cameras LC2 to LC5 provide a linear view field LIF of one of the sidewalls W1 and W2 through the mirror MIR2.

Figure 9B:
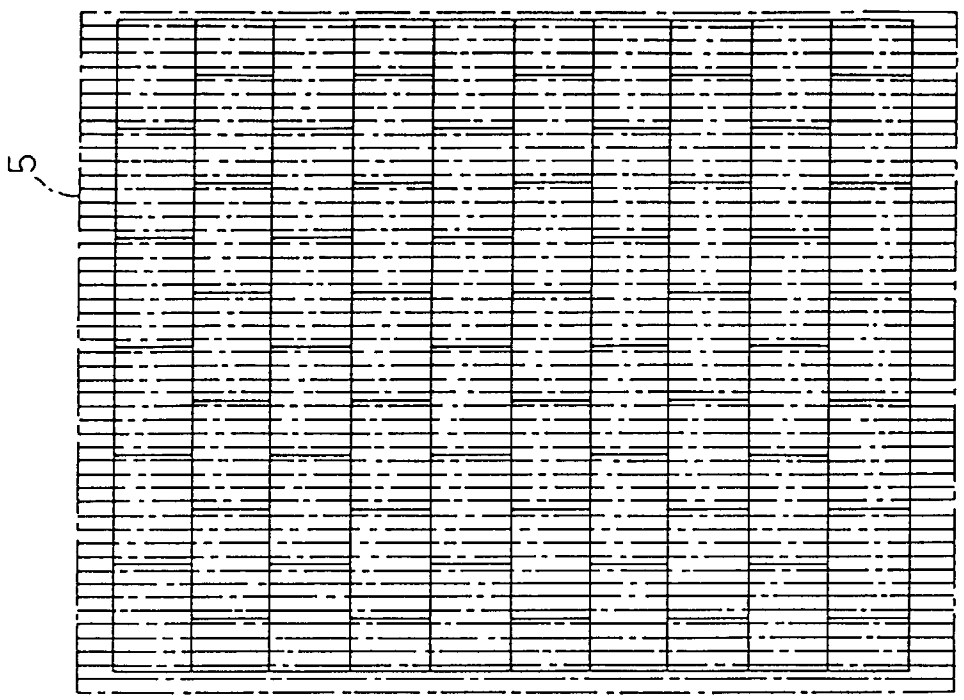
FIG. 9(*a*) is a side view showing a sidewall photographed by linear cameras with a reflection mirror.
Figure 9A:
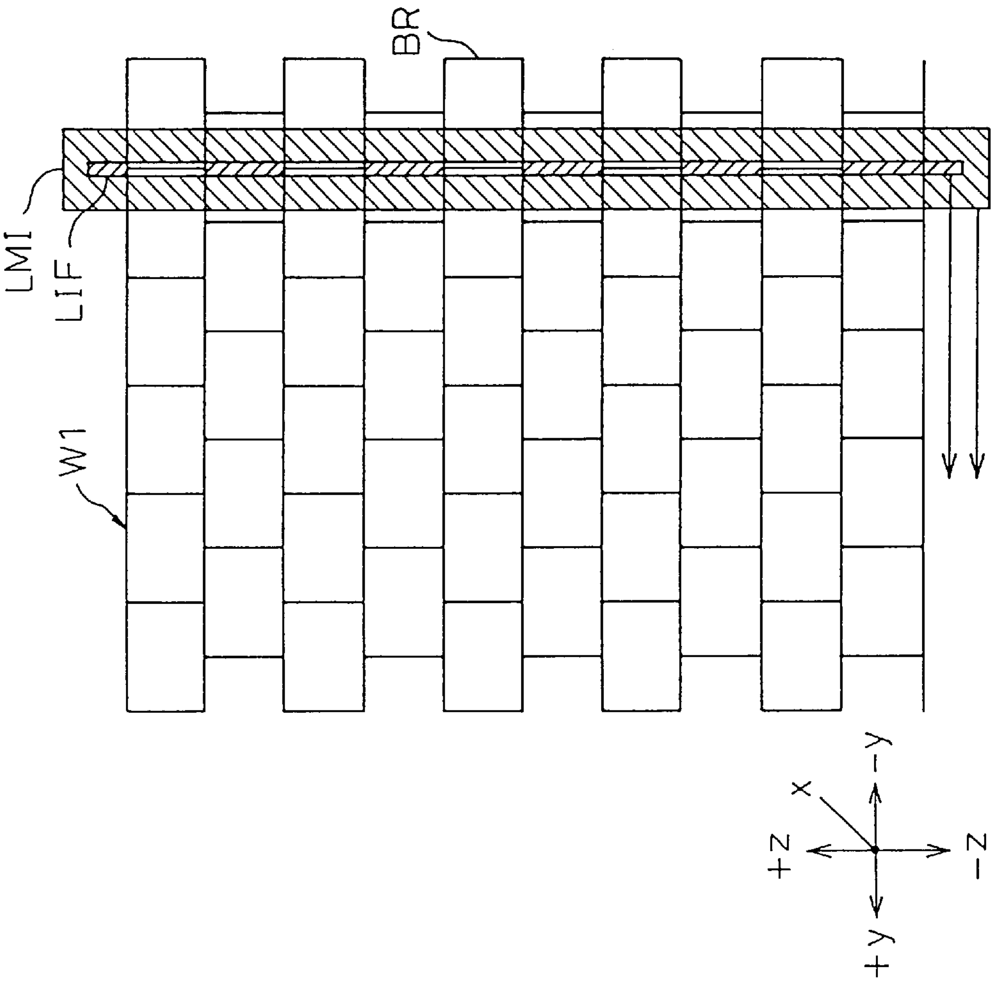

FIGS. 9(*a*) and 9(*b*) show images of the sidewall W1 provided by one of the cameras LC2 to LC5. Namely, the arm HSA moves the mirrors and cameras along the y-axis, and the image storage unit 11 (FIG. 3(*a*)) stores image data into the image memories 112 to 115 whenever the arm HSA is driven for a predetermined short distance. The image data in the memories 112 to 115 has a y-z distribution and is defined with y- and z-coordinates. The image data is read out of the image memories and is displayed on a display or printed on a printer with the y-axis of the image data serving as a horizontal scan axis and the z-axis thereof serving as a vertical scan axis.

FIG. 9(*b*) shows a two-dimensional image photographed by moving the mirror MIR2 and camera LC2 along the y-axis.

While the cameras are photographing the sidewall, the focal distances of the cameras and the distances between the cameras and the sidewall are substantially constant. Accordingly, the displayed or printed image has uniform resolution and magnification as if it shows a front view of the sidewall. The displayed or printed image is two dimensionally a y-axis combination of linear images each extending along the z-axis. Each of the linear images is formed by a shot of the cameras from the front view of the sidewall and contains information about irregularities on the surface of the sidewall. The displayed or printed image is used to inspect the surface conditions of the sidewall. For example, one can observe breakage and deformation of firebricks and joints of the sidewall on the image. If any part of the sidewall has irregularities due to flaking or carbide adhesion, the displayed or printed image of the part will be blurred or uneven, and therefore, will easily be identified. Consequently, the present invention realizes the correct and reliable monitoring of the surface of a wall of a structure.

When the mirrors and cameras are moved along the y-axis, they are affected by mechanical vibration. The mirrors have a function to reduce the influence of the mechanical vibration. This will be explained.

Figure 10A:
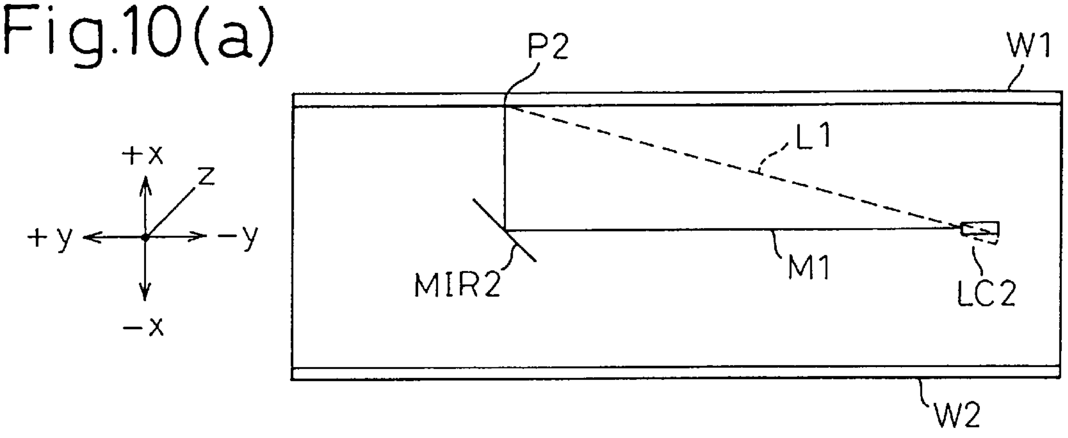
FIG. 10(*a*) is a plan view showing an arrangement of a reflection mirror and a linear camera without x-axis vibration.
Figure 10B:
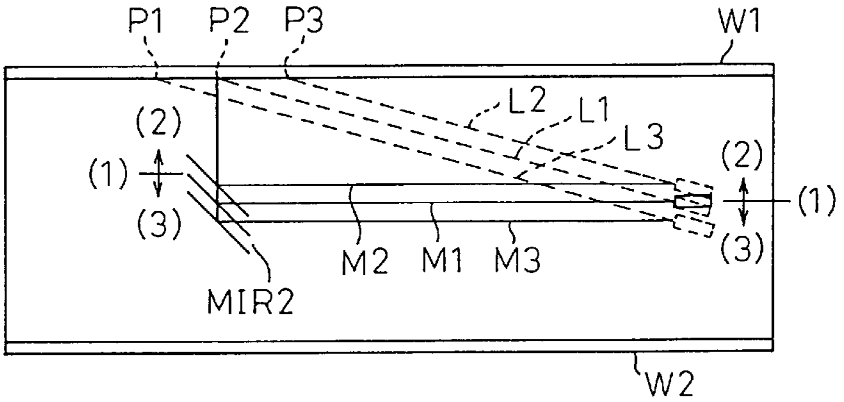
Figure 10C:
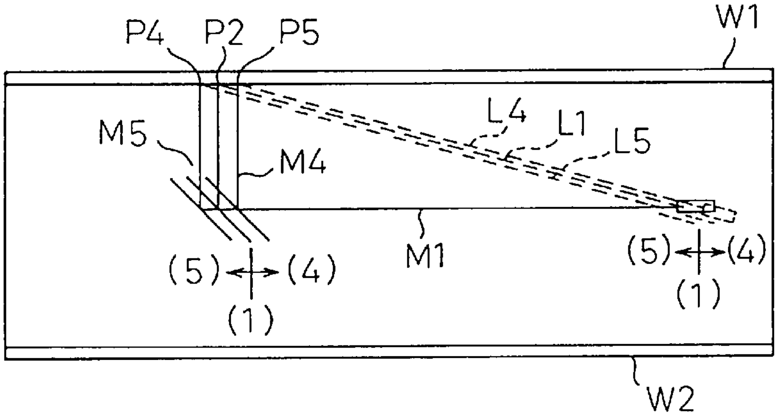

FIG. 10(*a*) is a plan view showing the camera LC2 photographing the sidewall W1 through the mirror MIR2. A dotted line L1 indicates an optical axis of the camera LC2 when it directly photographs a spot P2 on the sidewall W1. A continuous line M1 indicates an optical axis of the camera LC2 when it photographs the spot P2 through the mirror MIR2. In FIG. 10(*b*), the camera LC2 and mirror MIR2 are shifted from a reference position (1) to positions (2) and (3) along the x-axis due to mechanical vibration.

At the reference position (1), the camera LC2 correctly photographs the spot P2 with or without the mirror MIR2. If the camera is shifted to the position (2), the direct optical axis L1 shifts to an optical axis L2 that hits a spot P3 instead of the spot P2 on the sidewall W1, thereby causing a deviation of d1=P2−P3. At this time, the mirror-passing optical axis M1 shifts to an optical axis M2, which hits the spot P2 on the sidewall W1, to cause a deviation of m1=P2−P2=0. If the camera is shifted to the position (3), the direct optical axis L1 shifts to an optical axis L3 that hits a spot P1, to cause a deviation of d2=P1−P2. At this time, the mirror-passing optical axis M1 shifts to an optical axis M3, which hits the spot P2 to cause a deviation of m2=P2−P2=0.

FIG. 10(*c*) shows the camera LC2 and mirror MIR2 that shift from the reference position (1) to positions (4) and (5) along the y-axis due to mechanical vibration.

At the reference position (1), the direct and mirror-passing optical axes L1 and M1 hit the same spot P2 on the sidewall W1. When the camera shifts to the position (4), the direct optical axis L1 shifts to an optical axis L4 that hits a spot P5 on the sidewall W1, to cause a deviation of d3=P2–P5. At this time, the mirror-passing optical axis M1 shifts to an optical axis M4 that hits the spot P5 on the sidewall W1, to cause a deviation of m3=P2–P5. When the camera shifts to the position (5), the direct optical axis L1 shifts to an optical axis L5 that hits a spot P4 on the sidewall W1, to cause a deviation of d4=P4–P2. At this time, the mirror-passing optical axis M1 shifts to an optical axis MS that hits the stop P4 on the sidewall W1, to cause a deviation of m4=P4–P2. Accordingly, m3=d3, and m4=d4. These deviations are equal to vibration amplitudes.

Figure 11A:
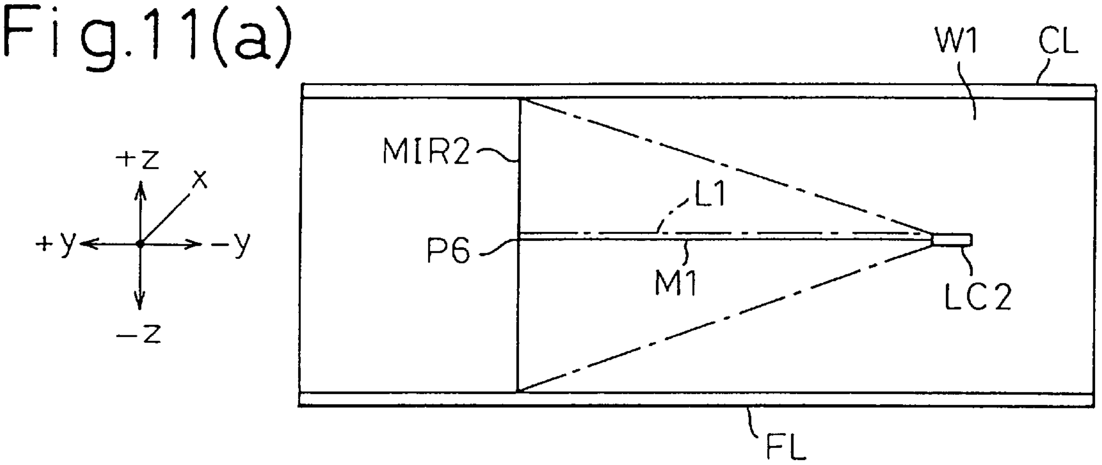
FIG. 11(*a*) is a sectional view showing an arrangement of a reflection mirror and a linear camera without z-axis vibration.
Figure 11B:
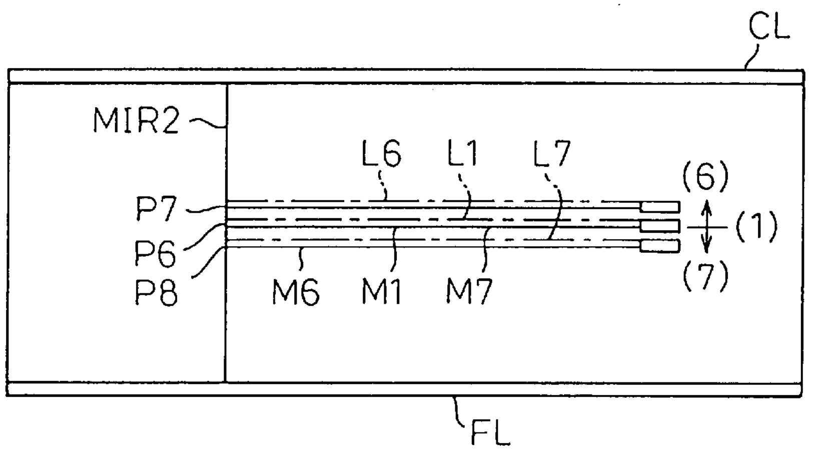
Figure 11C:
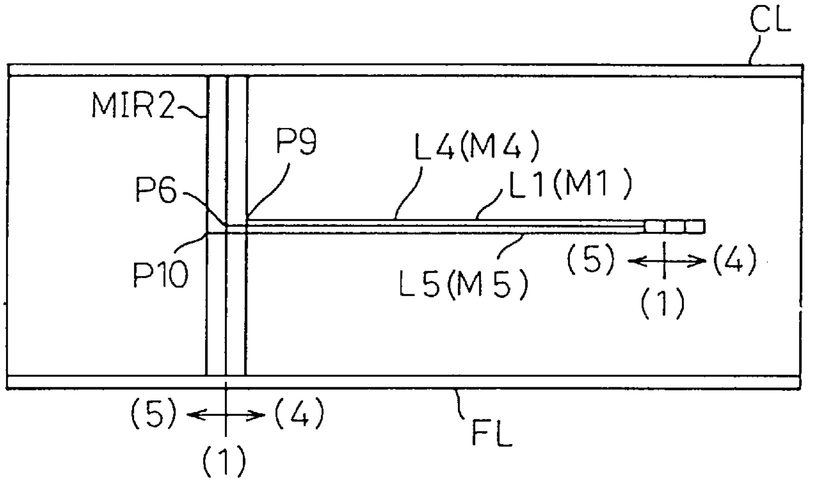

FIG. 11(*a*) is a vertical art front view showing the camera LC2 and mirror MIR2 arranged, to photograph the sidewall W1. This drawing corresponds to FIG. 10(*a*). A dotted line L1 indicates a direct optical axis of the camera LC2 when directly photographing a spot P6 on the sidewall W1. A continuous line M1 indicates a mirror-passing optical axis of the camera LC2 when photographing the spot P6 through the mirror MIR2. FIG. 11(*b*) shows the camera LC2 shifting from a reference position (1) to positions (6) and (7) along the z-axis due to mechanical vibration. When the camera shifts to the position (6), the direct optical axis L1 shifts to an optical axis L6 to hit a spot P7 on the sidewall W1, to cause a deviation of d5=P7–P6. At this time, the mirror-passing optical axis M1 shows the same shift to cause a deviation of m5=P7–P6. When the camera shifts to the position (7), the direct optical axis L1 shifts to an optical axis L7 to hit a spot P8 on the sidewall W1, to cause a deviation of d6=P6–P8. At this time, the mirror-passing optical axis M1 shows the same shift to cause a deviation of m6=P6–P8. Namely, d5=m5, and d6=m6. These deviations are equal to the vibration in amplitude and direction.

There is no influence on photographed images even if the mirror MIR2 and camera LD2 are vibrated along the z-axis.

FIG. 11(*c*) corresponds to FIG. 10(*c*) and shows the camera LC2 and mirror MIR2 shifting from the reference position (1) to the positions (4) and (5) along the y-axis due to mechanical vibration.

When the camera shifts to the position (4), the direct optical axis L1 shifts to the optical axis L4 to hit a spot P9 on the sidewall W1, to cause a deviation of d7=P9–P6. At this time, the mirror-passing optical axis shows the same shift to cause a deviation of m7=P9–P6. When the camera shifts to the position (5), the direct optical axis L1 shifts to the optical axis L5 to hit a spot P10 on the sidewall W1, to cause a deviation of d8=P6–P10. At this time, the mirror-passing optical axis shows the same shift to cause a deviation of m8=P6–P10. Namely, d7=m7, and d8=m8. These deviations are equal to the vibration in amplitude and direction.

As explained above, directly photographing a sidewall with an obliquely set camera is greatly influenced by x-axis vibration. When the camera is vibrated with respect to the sidewall, a spot on the sidewall to be photographed fluctuates along the length of the coking chamber, to vary a photographing area and distort a photographed image. The reflection mirrors are effective to reduce the influence of such vibration. The reflection mirrors are mounted on the structure that supports the cameras and are effective to reduce the influence of vibration on photographed images.

An apparatus for monitoring the surface of a wall of a coke oven according to still another embodiment of the present invention will be explained. The apparatus has distance measuring units (TRL1 to TRL3, TRR1 to TRR3) for measuring distances to the wall, and/or a photographing unit for photographing the wall. A lance (201) supports the distance measuring units and/or photographing unit. A driver (LFIX, LDRV) drives the lance into and out of the coke oven along a y-axis. The lance has heat resisting strings (207, 202) that extend from a front end (208F) toward a rear end (208A) of the lance. The strings are in parallel with each other and vertically spaced away from each other. The strings are longitudinally tensioned by tensioners (209, 210). Detectors (205, 206, 203, 204) detect deflection angles θ1 and θ2 of the strings with respect to respective reference lines that run along the y-axis. A unit (LPOS) measures the position of the lance on the y-axis. A unit (CPT) calculates an inclination angle ϕ of the front end of the lance with respect to a y-z plane as well as x-axis positions of the distance measuring units, according to the deflection angles θ1 and θ2, the position measured by the unit LPOS, and the fitting positions of the distance measuring units.

If the front end (208F) of the lance is twisted to form an inclination angle with respect to the y-z plane, the positions of the distance measuring units (TRL1 to TRL3, TRR1 to TRR3) fluctuate along the x-axis. This fluctuates distances measured to the wall. It is necessary, therefore, to correct the measured distances according to the changes in the positions of the distance measuring units. For this purpose, this embodiment measures an inclination angle ϕ of the lance front end (208F). To measure the inclination angle ϕ, the embodiment employs the two strings (207, 202) that extend from the front end (208F) to the rear end (208A) of the lance. The strings are in parallel with each other and are vertically spaced away from each other. The strings are longitudinally tensioned by the tensioners (209, 210). The deflection measuring units (205, 206, 203, 204) detect horizontal deflection angles θ1 and θ2 of the strings with respect to the respective reference lines that run along the y-axis.

To calculate the inclination angle ϕ of the front end (208F) of the lance, the positions of the front ends of the two strings are calculated. Then, the inclination angle ϕ is calculated according to deviations in the positions of the front ends of the two strings and a distance (v) between the two strings.

The calculation unit (CPT) calculates the positions of the distance measuring units (TRR1 to TRR3) according to the inclination angle ϕ, a string fixing position (P20), and the distances (A, H1 to H3) of the distance measuring units from the string fixing position.

First Example

Figure 12A:
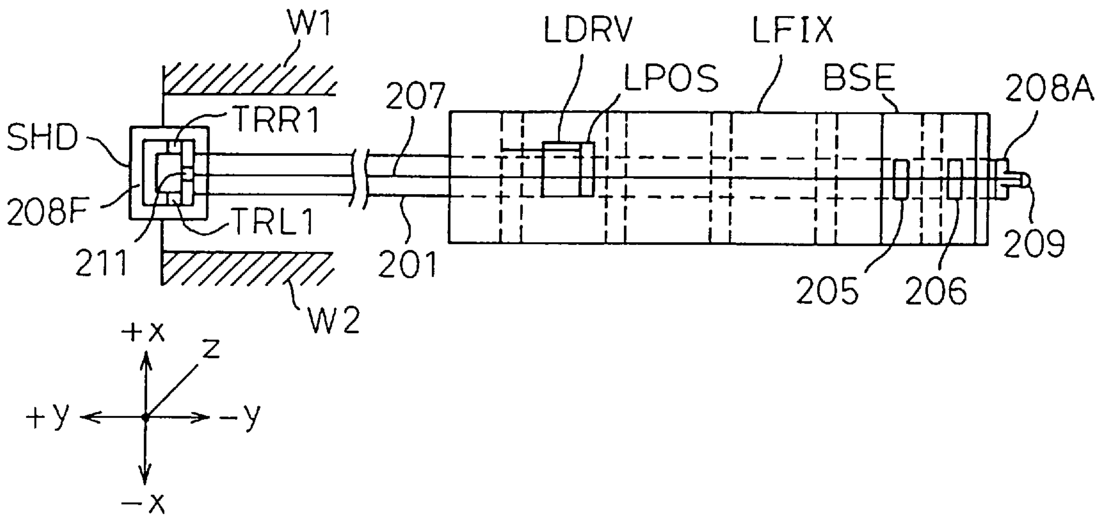
FIG. 12(*a*) is a plan view showing a ceramic fiber string 207 for measuring an inclination of a front end 208F of a lance.
Figure 12B:
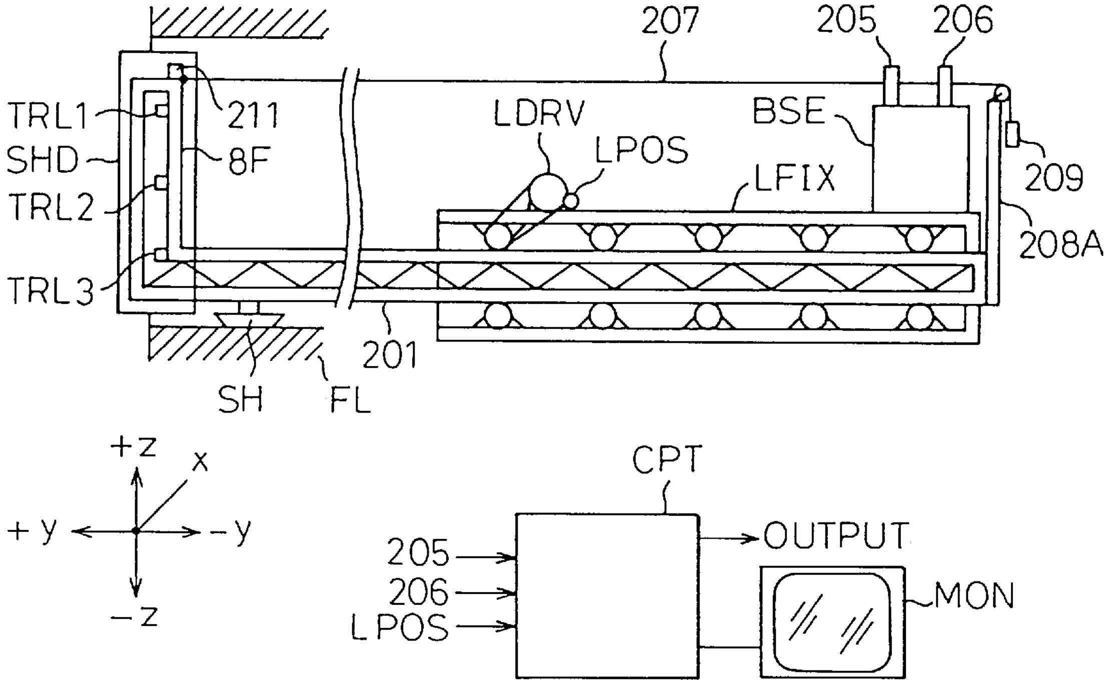

FIG. 12(*a*) is a plan view showing a first example of the apparatus for monitoring the walls of a coking chamber of a coke oven, having distance measuring units according to the present invention, and FIG. 12(*b*) is a front view showing the apparatus. In the following explanation, the width of the coking chamber corresponds to an x-axis, the depth or length thereof to a y-axis, and the height thereof to a z-axis. A U-shaped lance 201 is driven from an inlet to an exit of the coking chamber. The lance 201 has a vertical front end 208F that supports the non-contact distance measuring units (sensors) TRL1 to TRL3 and TRR1 to TRR3, to measure distances up to sidewalls W1 and W2 of the cooling chamber.

The distances are measured between coke production processes, and therefore, the distance measuring units TRL1 to TRL3 and TRR1 to TRR3 must resist high temperatures in the coking chamber. For this purpose, the distance measuring units are accommodated in a heat insulation head SHD having a cooling mechanism. The head SHD has windows made of heat resisting glass for passing light beams used to measure the distances. The peripheries of the windows are provided with gas purge heads for jetting gas for purging dust from the windows.

The lance 201 has a sled-like shoe SH that slides on the floor of the coking chamber while supporting the weight of the lance. A horizontal part of the lance 201 is supported with a stationary unit LFIX, which has many rollers on which the lance 201 travels. A lance driver LDRV drives the lance 201 along the y-axis. A position measuring unit LPOS measures a movement of the lance 201 along the y-axis. A lance base BSE is attached to the stationary unit LFIX. A heat resisting string 207 made of ceramic fibers is stretched between the front end 208F and a rear end 208A of the lance 201.

An end of the string 207 is fixed to the front end 208F, and the other end thereof is connected to a weight 209 that tensions the string 207 through a pulley. Accordingly, the string 207 receives a constant tension even if the lance 201 is deformed or moved. The lance base BSE supports defection measuring units 205 and 206 through which the string 207 extends.

The deflection measuring units 205 and 206 are sensors for measuring a horizontal deflection angle θ formed between the string 207 and a reference line that runs along the y-axis.

A calculation unit CPT is arranged in the vicinity of the stationary unit LFIX, to calculate the deflection angle of the string 207, the position of the front end 208F, etc., according to the deflection of the string 207, the movement of the lance, etc. A monitor MON is arranged close to the calculation unit CPT.

Figure 13A:
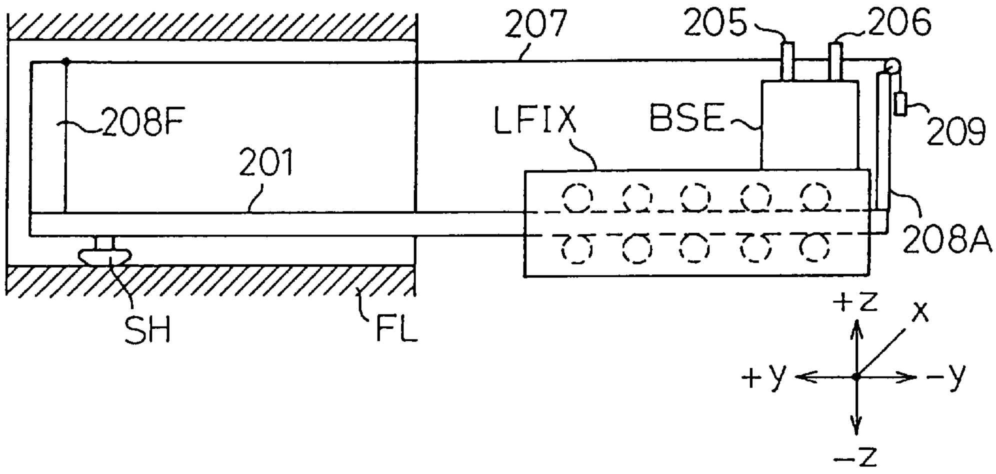
FIG. 13(*a*) shows a technique of measuring an x-axis inclination of the lance front end 208F with the use of a string.
Figure 13B:
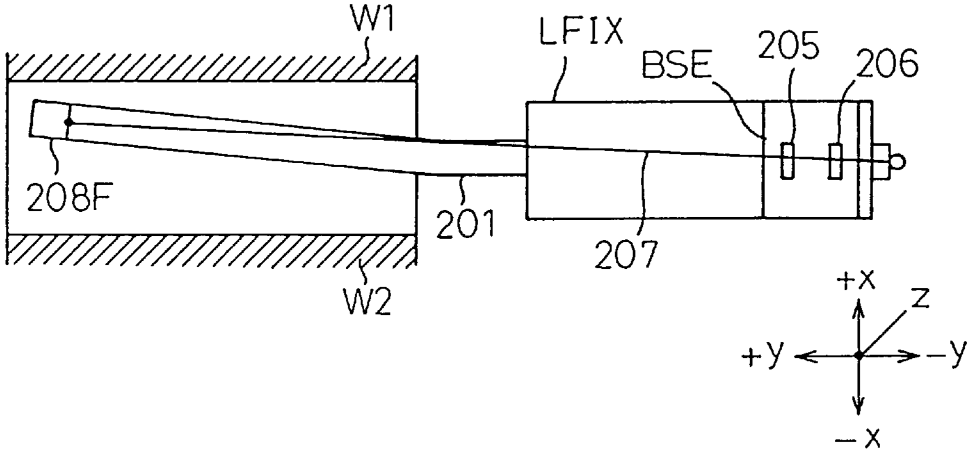
Figure 13C:
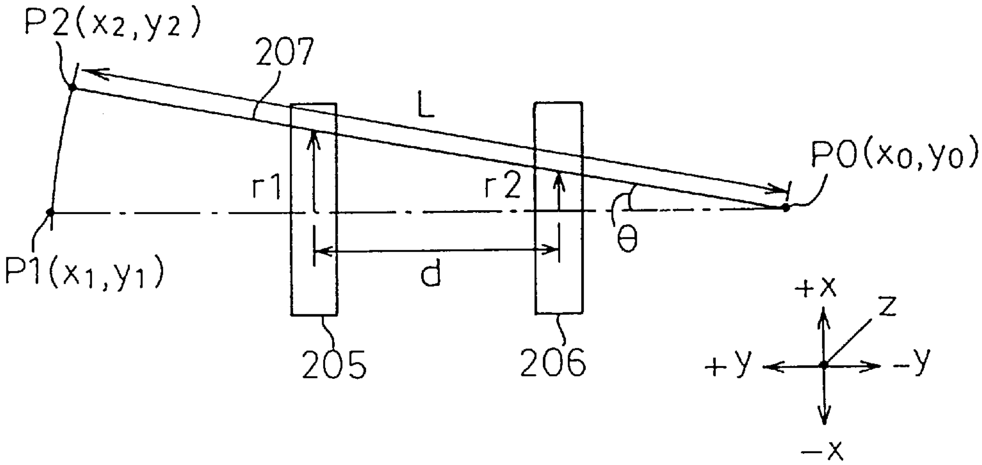

FIGS. 13(*a*) to 13(*c*) show a technique of detecting the position of the front end 208F of the lance 201 with the use of the string 207. The string 207 is made of, for example, continuous long fibers of γ/δ alumina and amorphous silica. The string 207 is usable for a long time under 1100 degrees centigrade. An end of the string 207 is passed through the deflection measuring units 205 and 206 and is connected to the weight 209. The units 205 and 206 are installed on the lance base BSE.

The deflection measuring units 205 and 206 measure the movement of the string 207 along the x-axis with the use of semiconductor lasers at an accuracy of 2 μm. The units 205 and 206 are used with a controller (not shown).

In FIG. 13(*b*), the front end 208F of the lance 201 is horizontally deflected along the x-axis with respect to a y-z plane due to, for example, the leaning or deformation of the lance. Even if the lance non-linearly deforms, the string 207 deflects according to the entire deformation of the lance, and therefore, there is no problem in measuring the position of the front end 208F.

FIG. 13(*c*) is an enlarged view showing the deflection measuring units 205 and 206. A position P1(x1, y1) on the front end 208F of the lance 201 is obtained before the lance is inserted into the coking chamber. The string 207 is horizontally aligned with the y-axis reference line according to an optical technique. Alternatively, the length L of the string 207 is measured in advance, and the position P1(x1, y1) is calculated according to a reference point P0(x0, y0). After deformation, the front end 208F will be at a position P2 (x2, y2). A deflection of the string 207 along the x-axis due to the deformation is provided by the deflection measuring unit 205 as a deflection distance r1 from the reference line, and by the deflection measuring unit 206 as a deflection distance r2 from the reference line. A distance d between the deflection measuring units 205 and 206 is constant and known.

A deflection angle θ between a segment P0-P1 and a segment P0-P2 is as follows:

$$\theta = \tan^{-1}\frac{r1 - r2}{d}$$

Since the deflection of the lance 201 is small compared with the total length thereof, a change in the length of the string 207 due to the deflection can be ignored. Accordingly, the coordinates x2 and y2 of the position P2 (x2, y2) of the front end 208F are as follows:

$$x2 = x0 + L \sin\theta$$

$$y2 = y0 + L \cos\theta$$

where L is the length of the lance 201 and is known before inserting the lance 201 into the coking chamber.

The above calculations are carried out with the calculation unit CPT. The calculated coordinates are used to correct the positions of the distance measuring units TRL1 to TRL3 and TRR1 to TRR3 that are installed on the front end 208F of the lance 201. As a result, distances from the distance measuring units to the sidewalls W1 and W2 are correctly measured even if the front end 208F, i.e., the distance measuring units are horizontally shifted from the center line of the coking chamber.

Second Example

The positions of the distance measuring units TRL1 to TRL3 and TRR1 to TRR3 on the front end 208F of the lance 201 slightly differ from the fitting position of the string 207 on the front end 208F. If the front end 208F horizontally deflects, the positions of the distance measuring units must individually be corrected according to a deflected position of the front end of the string, which is calculated according to the first example.

If the lance is twisted to horizontally deflect the front end 208F thereof, the direction of a beam emitted from each distance measuring unit shifts in the y-axis direction, to change a distance to a sidewall measured by the distance measuring unit. This change in the measured distance, however, can be ignored because an actual deflection angle is very small compared with the total length of the lance.

Figure 14A:
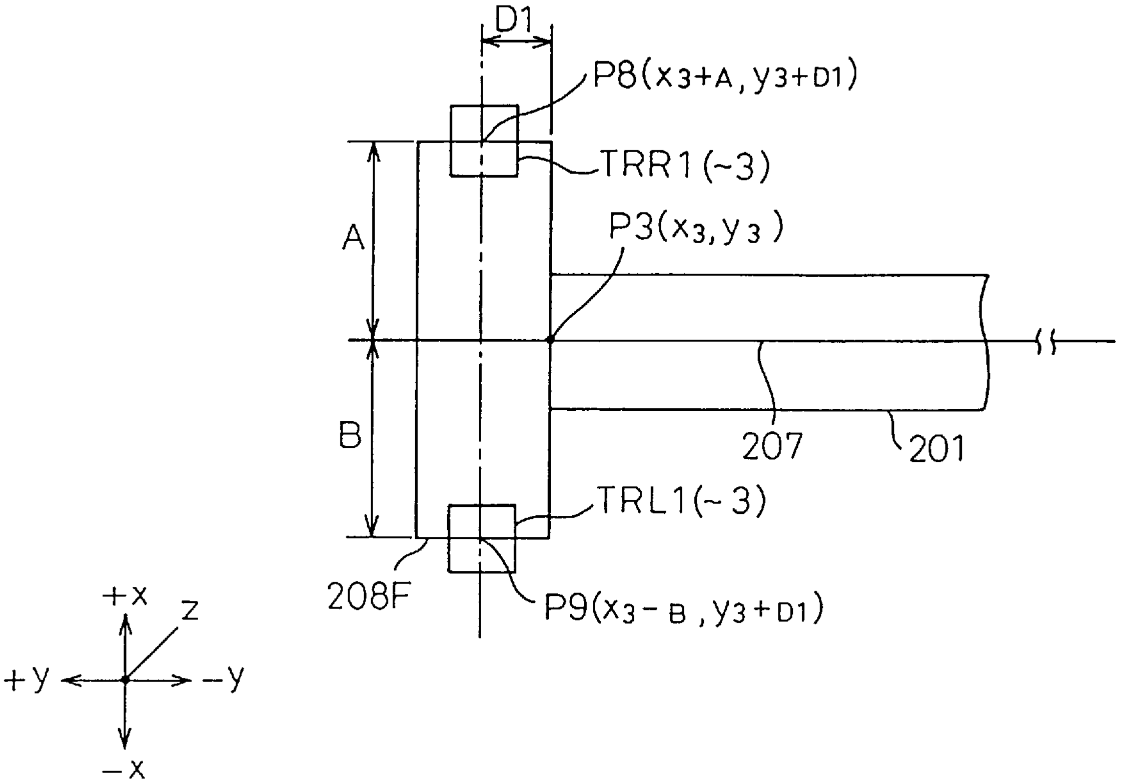
FIG. 14(*a*) is an enlarged plan view showing distance measuring units and string at the lance front end 208F.
Figure 14B:
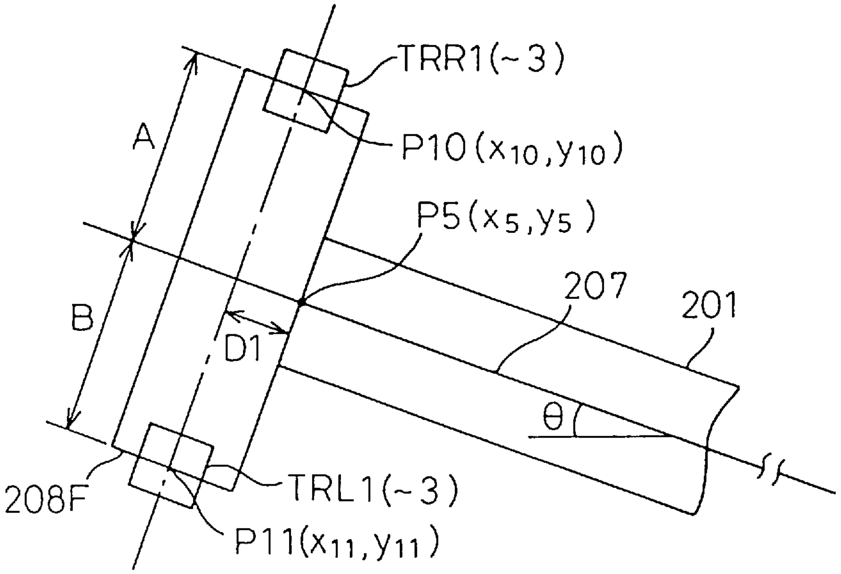

FIG. 14(*a*) is a plan view showing the front end 208F of the lance 201 having the distance measuring units TRL1 to TRL3 and TRR1 to TRR3. A position P3(x3, y3) of the front end of the string 207 is obtained according to the technique of the first example. The distance measuring unit TRR1 (to TRR3) is at a position P8(x3+A, y3+D1). The distance measuring unit TRL1 (to TRL3) is at a position P9(x3−B, y3+D1).

FIG. 14(*b*) is a plan view showing the front end 208F horizontally deflected by θ.

At this time, the front end of the string 207 is at a position P5(x5, y5) and the string 207 involves the deflection angle θ. The position P5 and the deflection angle θ are calculated according to the technique of the first example.

The x-coordinate of the position P5 is as follows:

$$x5 = x0 + L \sin\theta$$

The deflection of the lance 201 along the x-axis is small compared with the total length thereof, and therefore, the deflection angle θ is small. Accordingly, a change in the length of the lance due to the deflection can be ignored. Then, the y-coordinate of the position P5 is as follows:

$y5 \approx y0 + L$

A deflected position P11(x11, y11) of the distance measuring unit TRL1 is as follows:

$$x11 \approx x5 - (B - D1 \sin \theta)$$

$$y11 \approx y5 + D1 + B \sin \theta$$

A deflected position P10(x10, y10) of the distance measuring unit TRR1 is as follows:

$$x10 \approx x5 + (A + D1 \sin \theta)$$

$$y10 \approx y5 + D1 - A \sin \theta$$

These calculations are carried out with the calculation unit CPT. In this way, the positions of the distance measuring units TRR1 to TRR3 are corrected, to improve the measuring accuracy thereof. This results in correctly monitoring the profiles of the walls of the coking chamber. The other parts of the second example are the same as those of the first example, and therefore, are not explained again.

Third Example

When the lance 201 is twisted, the front end 208F thereof may incline with respect to the y-z plane. This will be explained.

If the front end 208F inclines with respect to the y-z plane, the positions of the distance measuring units TRL1 to TRL3 and TRR1 to TRR3 change to change distances measured to the sidewalls of the coking chamber. An angle $\phi$ of the inclination is actually small because the width of the front end 208F is a little smaller than the width of the coking chamber. This means that a positional change along the z-axis due to the inclination can be ignored. Also, a positional change along the y-axis of the distance measuring unit due to the inclination can be ignored. Only a positional change along the x-axis due to the inclination must be considered.

Figure 15A:
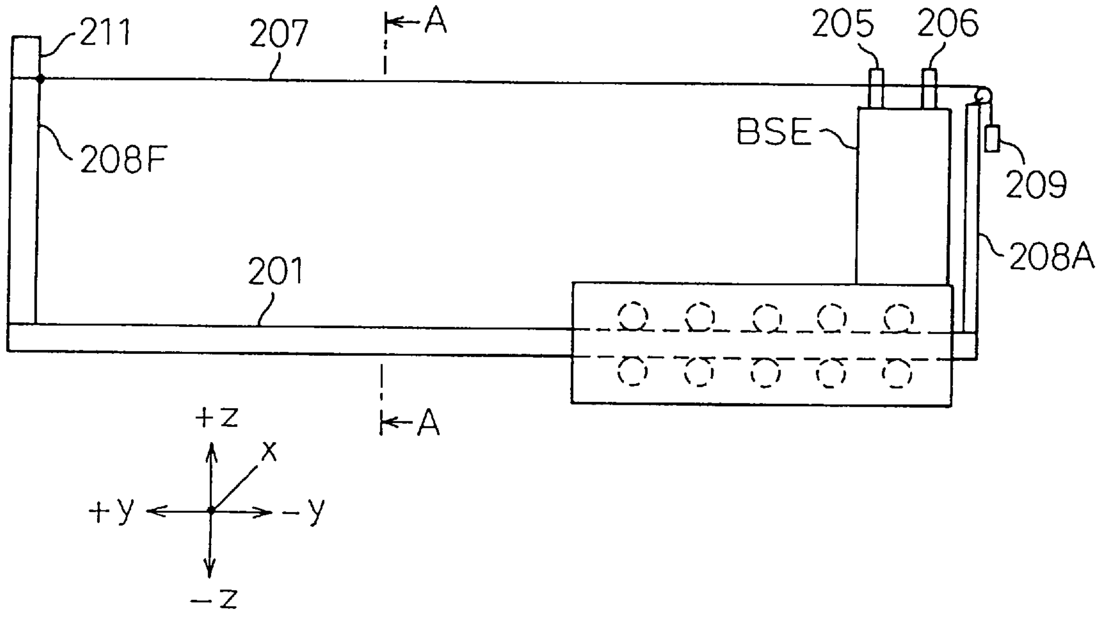
FIG. 15(*a*) is a front view showing a unit 211 for measuring an inclination of the lance front end 208F with respect to a y-z plane.
Figure 15B:
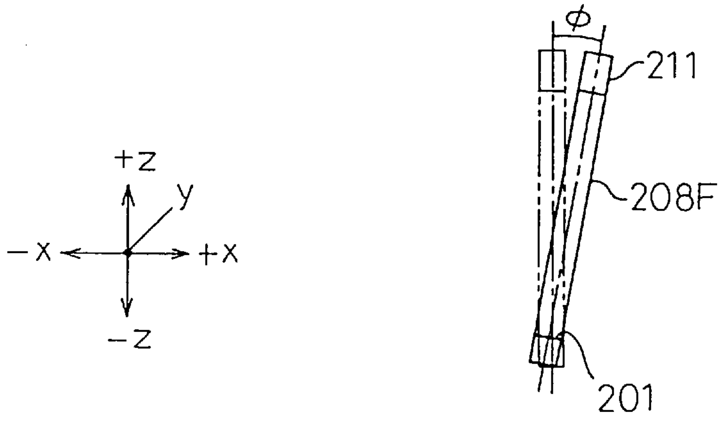

To consider the inclination, an inclination or twist angle of the front end 208F of the lance 201 with respect to the y-z plane is measured. FIG. 15(*a*) shows an inclination measuring unit 211 arranged at the front end 208F of the lance 201. FIG. 15(*b*) is a sectional view taken along a line A—A of FIG. 15(*a*), showing the front end 208F being inclined with respect to the y-z plane. The inclination measuring unit 211 is for a single axis and has a resolution of 0.24 minutes and a range of ±20 degrees. The inclination measuring unit 211 is used with a separate electronics unit (not shown), to measure an inclination angle $\phi$ of the front end 208F with respect to the y-z plane.

Figure 16:
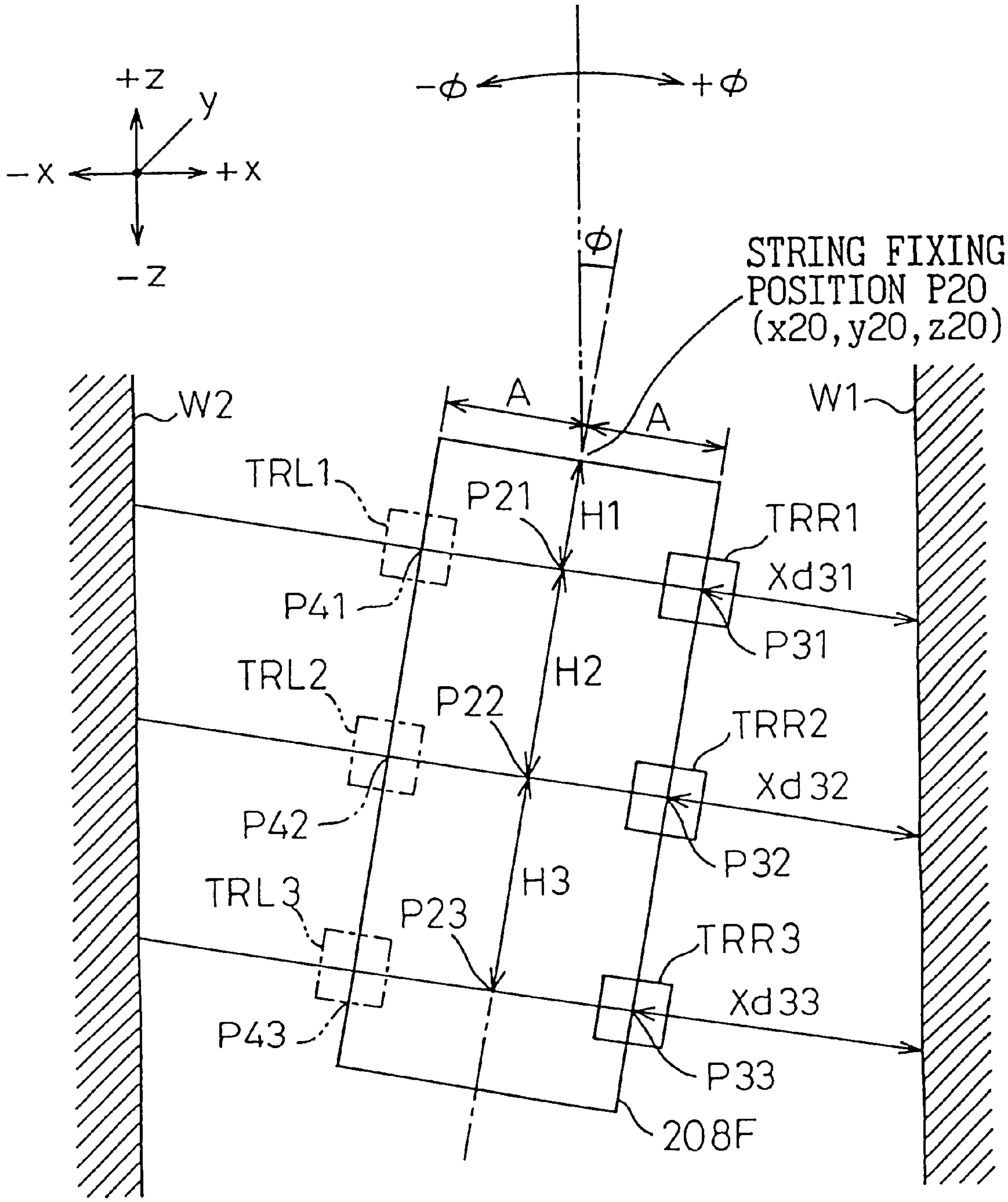
FIG. 16 is a sectional view showing distance measuring units on the inclined lance front end 208F.

FIG. 16 shows the front end 208F of the lance 201 inclined by $\phi$. The distance measuring units TRR1 to TRR3 and TRL1 to TRL3 are arranged on the front end 208F.

The positions of the distance measuring units TRR1 to TRR3 are calculated from the inclination angle $\phi$ provided by the inclination measuring unit 211, a fixed position P20 (x20, y20, z20) of the string 207 on the front end 208F, and the fitting positions of the units TRR1 to TRR3 on the front end 208F. The position P20 of the string 207 is calculated according to the technique of the first example.

The x-coordinates of points P21, P22, P23 on the center line of the front end 208F are as follows:

$$x21 = x20 - H1 \sin \phi$$

$$x22 = x20 - (H1 + H2) \sin \phi$$

$$x23 = x20 - (H1 + H2 + H3) \sin \phi$$

Accordingly, the x-coordinates of the units TRR1, TRR2, and TRR3 are as follows:

$$x31 = x22 + A$$

$$x32 = x22 + A$$

$$x33 = x23 + A$$

These calculations are carried out with the calculation unit CPT. In this way, the positions of the distance measuring units TRR1 to TRR3 are corrected, to improve the measuring accuracy thereof. This results in correctly observing the profiles of the walls of the coking chamber. The other parts of the third example are the same as those of the first example and, therefore, are not explained again.

Fourth Example

This example measures an inclination angle $\phi$ of the front end 208F of the lance 201 with two heat resisting strings 207 and 202 made of ceramic fibers.

Figure 17A:
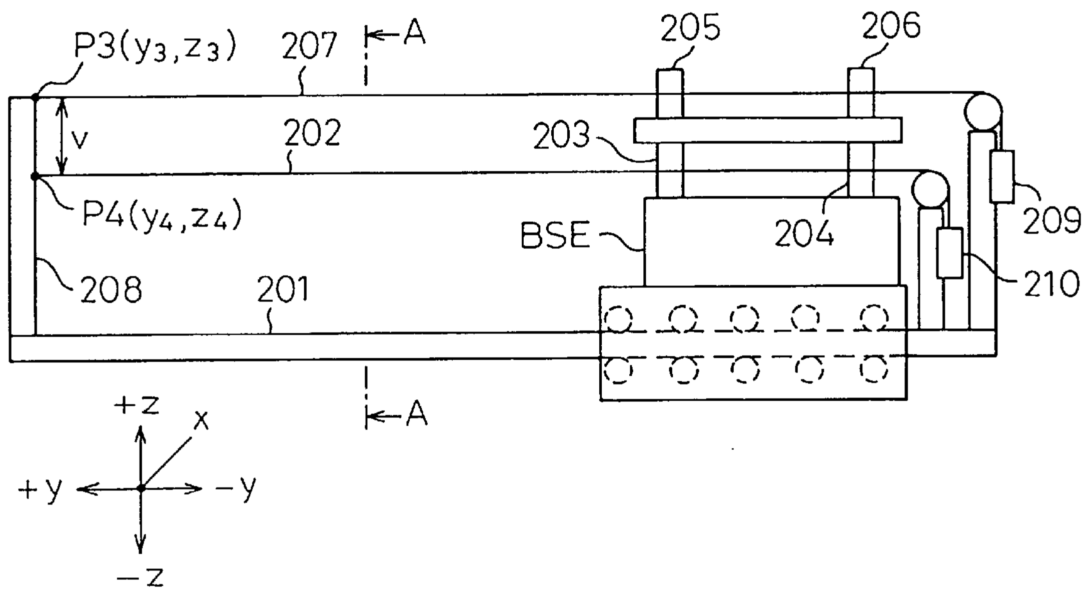
FIG. 17(*a*) shows a technique of measuring an inclination of the lance front end 208F with the use of two strings.
Figure 17B:
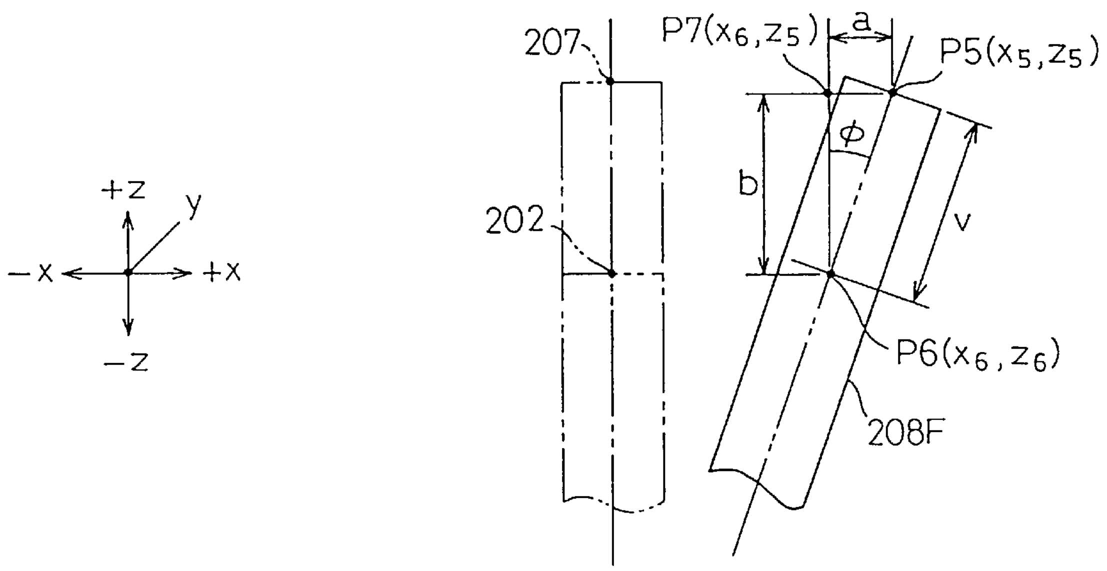

FIG. 17(*a*) shows the lance 201 provided with the strings 207 and 202. FIG. 17(*b*) is a sectional view taken along a line A—A of FIG. 17(*a*), showing the front end 208F of the lance 201 that is inclined. The strings 202 and 207 are in parallel with each other and are vertically spaced apart from each other by a distance v. The strings 202 and 207 pass through deflection measuring units 203–204 and 205–206 that are attached to the lance base BSE. The strings 202 and 207 are connected to weights 210 and 209 that apply a constant tension to the strings 202 and 207. The string 202, deflection measuring units 203 and 204, and weight 210 are the same as the string 207, deflection measuring units 205 and 206, and weight 209 of the first example.

Figure 18A:
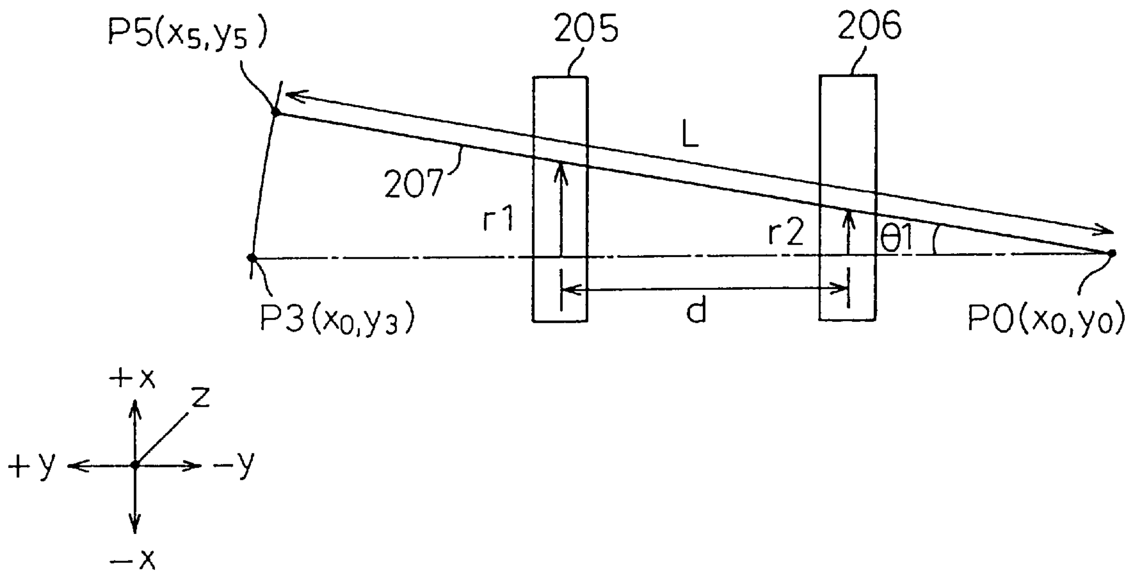
FIG. 18(*a*) is an enlarged plan view showing inclination measuring units 205 and 206 using the two strings.
Figure 18B:
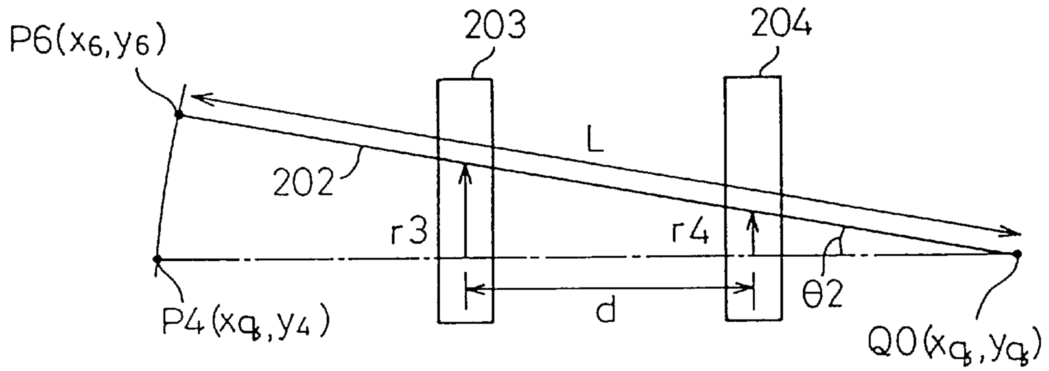
Figure 19A:
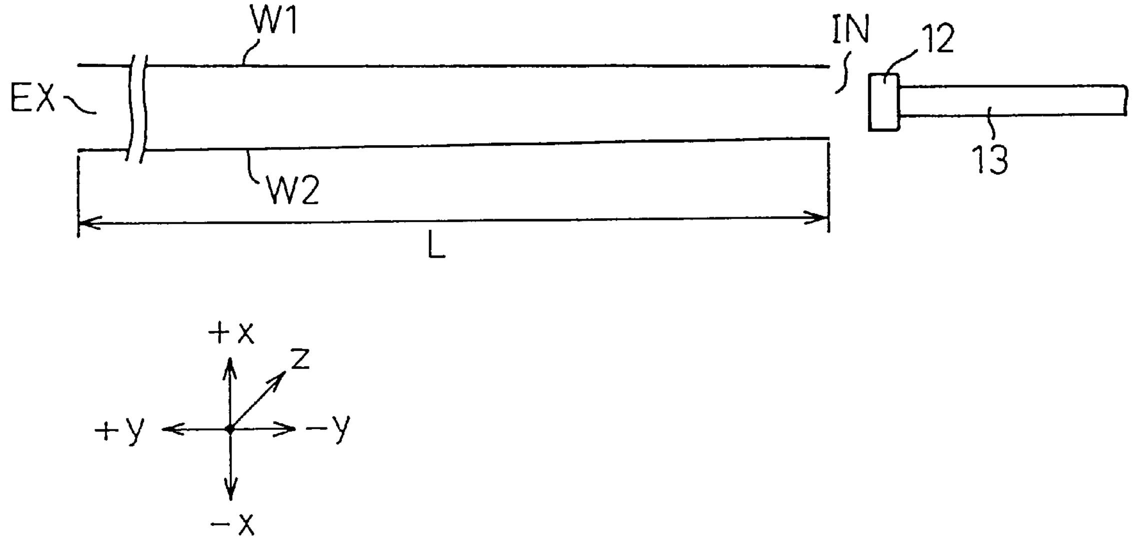
FIG. 19(*a*) is a plan view showing a coking chamber and a coke pushing machine or lence.
Figure 19B:
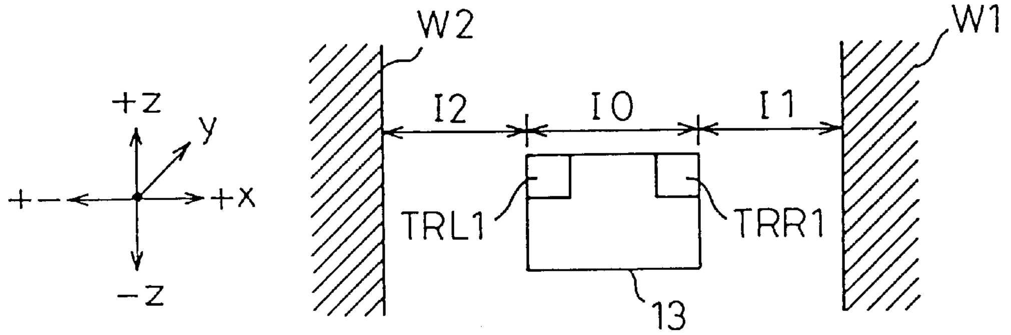

FIG. 18(*a*) shows the deflection measuring units 205 and 206 with the front end 208F being inclined with respect to the y-z plane. FIG. 18(*b*) shows the deflection measuring units 203 and 204. A position P5(x5, y5) of the front end of the string 207 and a position P6(x6, y6) of the front end of the string 202 after deflection are calculated according to the technique of the first example.

The string 207 forms an angle $\theta 1$ with respect to a reference line that extends along the y-axis, and the angle $\theta 1$ is expressed as follows:

$$\theta 1 = \tan^{-1} \frac{r1 - r2}{d}$$

where r1 is an x-deflection of the string 207 detected by the deflection measuring unit 205 and r2 is an x-deflection of the string 207 detected by the deflection measuring unit 206.

The string 202 forms an angle $\theta 2$ with respect to a reference line that extends along the y-axis. The angle $\theta 2$ is expressed as follows:

$$\theta 2 = \tan^{-1} \frac{r3 - r4}{d}$$

where r3 is an x-deflection of the string 202 detected by the deflection measuring unit 203 and r4 is an x-deflection of the string 202 detected by the deflection measuring unit 204.

A positional change along the z-axis due to the inclination of the front end 208F is small and can be ignored.

The position P5(x5, y5) on the front end 208F is expressed as follows:

$$x5=x0+L\sin\theta 1$$

$$y5=y0+L\cos\theta 1$$

The position P6(x6, y6) on the front end 208F is expressed as follows:

$$x6=xq+L\sin\theta 2$$

$$y6=xq+L\cos\theta 2$$

These calculations are carried out with the calculation unit CPT.

The positions P5 and P6 of the front ends of the strings 207 and 202 are used to calculate the inclination angle $\phi$ of the front end 208F. In FIG. 17(*b*), an intersection between the coordinate z5 of the position P5 and the coordinate x6 of the position P6 is P7(x6, z5).

The inclination angle $\phi$ between segments P7–P6 and P5–P6 is as follows:

$$\phi=\sin^{-1}\frac{\sqrt{v^2-(x5-x6)^2}}{v}$$

This calculation is carried out with the calculation unit CPT.

The other parts of the fourth example are the same as those of the first to third examples and, therefore, are not explained again.

In the above examples, the front end 208F of the lance 201 is horizontally deflected from the y-z plane by an angle of $\theta$, or is inclined with respect to the y-z plane by an angle of $\phi$.

We claim:

1. An apparatus for monitoring the surface of a wall of a structure, comprising:

a linear camera for photographing the wall and providing an image signal having a z-axis distribution;

y-driving means for driving the camera along a y-axis so that a linear or slit-like view field of the camera is moved substantially in parallel with a z-axis and so that an optical axis of the camera crosses the wall at an angle smaller than 90 degrees, said angle being fixed by said y-driving means and the wall being substantially in parallel with a y-z plane;

an image memory;

A/D conversion means for converting the image signal into digital image data;

write means for writing the digital image data into the image memory whenever the camera is moved for a predetermined short distance along the y-axis, to store two-dimensional image data having a y-z distribution in the image memory; and means for reading the image data out of the image memory and displaying a two-dimensional image on two-dimensional output means.

2. An apparatus for monitoring the surfaces of first and second pairs of walls of a structure, comprising:

first and second groups of linear cameras for photographing the walls and providing image signals having z- and x-axis distributions, respectively;

y-driving means for driving the first and second camera groups along a y-axis so that a linear or slit-like view field of the first camera group is moved substantially in parallel with a z-axis, so that an optical axis of the first camera group crosses the first wall pair at a first angle smaller than 90 degrees, said first angle being fixed by said y-driving means and the first wall pair being substantially in parallel with a y-z plane, so that a linear view field of the second camera group is moved substantially in parallel with an x-axis, and so that an optical axis of the second camera group crosses the second wall pair at a second angle smaller than 90 degrees, said second angle being fixed by said y-driving means and the second wall pair being substantially in parallel with an x-y plane;

an image memory;

A/D conversion means for converting the image signal provided by the first camera group into first digital image data and the image signal provided by the second camera group into second digital image data;

write means for writing the digital image data into the image memory whenever the first and second camera groups are moved for a predetermined short distance along the y-axis, to store the first digital image data as two-dimensional image data having a y-z distribution and the second digital image data as two-dimensional image data having an x-y distribution; and means for reading the image data out of the image memory and displaying two-dimensional images on two-dimensional output means.

3. The apparatus of claim 2, wherein:

the second camera group includes first and second linear cameras for photographing the walls of the second pair that are substantially in parallel with the x-y plane and face each other; and the write means writes, into the image memory, the image data provided by the first camera as first two-dimensional image data having an x-y distribution and the image data provided by the second camera as second two-dimensional image data having an x-y distribution.

4. The apparatus of claim 2, further comprising:

a turning mechanism for supporting the first camera group and selectively orienting the first camera group toward one of the walls of the first pair that are substantially in parallel with the y-z plane and face each other, the turning mechanism being supported by the y-driving means.

5. An apparatus for monitoring the surfaces of walls of a coke oven, comprising:

a first group of linear cameras arranged along a z-axis, an optical axis of the first camera group crossing one of the sidewalls of the coke oven at an angle in the range of 10 to 20 degrees, the sidewalls being substantially in parallel with a y-z plane, a linear or slit-like view field of the first camera group being substantially in parallel with the z-axis;

a rotary mechanism for supporting the first camera group and turning the first camera group so that the optical axis of the first camera group may cross one of the sidewalls at an angle in the range of 10 to 20 degrees;

a second group of linear cameras including first and second linear cameras, an optical axis of the first camera crossing one of the top and bottom walls of the coke oven at a first angle in the range of 10 to 20 degrees, the top and bottom walls being substantially in parallel with an x-y plane, a linear view or slit-like field of the first camera being substantially in parallel with an x-axis, an optical axis of the second camera crossing the other of the top and bottom walls at a second angle in the range of 10 to 20 degrees, a linear view or slit-like field of the second camera being substantially in parallel with the x-axis;

y-driving means for supporting the rotary mechanism as well as the second camera group, fixing said first angle and driving them along a y-axis;

an image memory;

A/D conversion means for converting an image signal having a z-axis distribution provided by each of the cameras of the first group into digital image data and an image signal having an x-axis distribution provided by each of the cameras of the second group into digital image data;

write means for writing the digital image data into the image memory whenever the first and second camera groups are moved for a predetermined short distance along the y-axis, to store the digital image data of the first camera group as two-dimensional image data having a y-z distribution and the digital image data of the second camera group as two-dimensional image data having an x-y distribution; and means for reading the image data out of the image memory and displaying two-dimensional images on two-dimensional output means.

6. An apparatus for monitoring the surface of a wall of a structure, comprising:

a linear camera for photographing the wall and providing an image signal having a z-axis distribution;

a reflection mirror arranged on a y-axis in front of the camera, to deflect an optical axis of the camera in an x-axis direction;

y-driving means for driving the camera and mirror along a y-axis so that the length of the mirror is moved substantially in parallel with a z-axis, so that a linear view field of the camera is moved substantially in parallel with the z-axis, and so that the camera photographs the wall through the mirror, the wall being substantially in parallel with a y-z plane;

an image memory;

A/D conversion means for converting the image signal into digital image data;

write means for writing the digital image data into the image memory whenever the camera and mirror are moved for a predetermined short distance along the y-axis, to store two-dimensional image data having a y-z distribution in the image memory; and means for reading the image data out of the image memory and displaying a two-dimensional image on two-dimensional output means.

7. An apparatus for monitoring the surfaces of first and second pairs of walls of a structure, comprising:

first and second groups of linear cameras for photographing the walls and providing image signals having z- and x-axis distributions, respectively;

a reflection mirror related to the first camera group;

y-driving means for driving the mirror and first and second camera groups along a y-axis so that the length of the mirror is moved substantially in parallel with a z-axis, so that a linear view field of the first camera group is moved substantially in parallel with the z-axis, so that the first camera group photographs the first wall pair through the mirror, the first wall pair being substantially in parallel with a y-z plane, and so that the second camera group photographs the second wall pair that is substantially in parallel with an x-y plane;

an image memory;

A/D conversion means for converting the image signal provided by the first camera group into first digital image data and the image signal provided by the second camera group into second digital image data;

write means for writing the digital image data into the image memory whenever the mirror and first and second camera groups are moved for a predetermined short distance along the y-axis, to store the first digital image data as two-dimensional image data having a y-z distribution and the second digital image data as two-dimensional image data having an x-y distribution; and means for reading the image data out of the image memory and displaying two-dimensional images on two-dimensional output means.

8. The apparatus of claim 7, wherein:

the second camera group includes first and second linear cameras for photographing the walls of the second pair that are substantially in parallel with the x-y plane and face each other; and the write means writes, into the image memory, the image data provided by the first camera as first two-dimensional image data having an x-y distribution and the image data provided by the second camera as second two-dimensional image data having an x-y distribution.

9. The apparatus of claim 7, wherein:

the mirror has a pair of reflection surfaces for reflecting light from the walls of the first pair that are substantially in parallel with the y-z plane and face each other; and the y-drive means supports a rotary mechanism for supporting the first camera group and selectively orienting the optical axis of the first camera group toward one of the reflection surfaces of the mirror.

10. An apparatus for monitoring the surfaces of walls of a coke oven, comprising:

a first group of linear cameras arranged along a z-axis, for photographing the left and right sidewalls of the coke oven that are substantially in parallel with a y-z plane, a linear view field of the first camera group being substantially in parallel with the z-axis;

a reflection mirror arranged on a y-axis in front of the camera, having a pair of reflection surfaces to deflect an optical axis of the first camera group toward the left and right sidewalls, the length of the mirror being substantially in parallel with the z-axis;

a rotary mechanism for supporting the first camera group and turning the optical axis of the first camera group toward one of the reflection surfaces of the mirror;

a second group of linear cameras including first and second linear cameras each having a linear view field that is substantially in parallel with an x-axis, the first camera photographing the top wall of the coke oven, the second camera photographing the bottom wall of the coke oven;

y-driving means for supporting the first camera group, mirror, rotary mechanism, and the second camera group and reciprocating them along the y-axis;

an image memory;

A/D conversion means for converting an image signal having a z-axis distribution provided by each of the cameras of the first group into digital image data and an image signal having an x-axis distribution provided by each of the cameras of the second group into digital image data;

write means for writing the digital image data into the image memory whenever the y-drive means moves a predetermined short distance along the y-axis, to store the digital image data of the first camera group as two-dimensional image data having a y-z distribution and the digital image data of the second camera group as two-dimensional image data having an x-y distribution; and means for reading the image data out of the image memory and displaying two-dimensional images on two-dimensional output means.

11. An apparatus for monitoring the surface of a wall of a structure, having at least one of a distance measuring unit for measuring a distance to the wall and a photographing unit for photographing the surface of the wall, a lance for supporting the at least one of the distance measuring unit and photographing unit, and drive means for reciprocating the lance into and out of the structure, the apparatus comprising:

a heat resisting string stretched from a front end of the lance to a rear end thereof;

tension means for longitudinally tensioning the string; and deflection measuring means for detecting a deflection angle (θ) of the string with respect to a reference line that runs along a y-axis.

12. The apparatus of claim 11, further comprising:

lance position measuring means for detecting a y-axis position of the lance; and calculation means for calculating an x-axis position of the front end of the lance according to the deflection angle (θ) and the y-axis position.

13. The apparatus of claim 12, further comprising:

inclination measuring means for detecting an inclination angle (ϕ) of the front end of the lance with respect to a y-z plane, the calculation means calculating an x-axis position of the distance measuring unit according to the deflection angle (θ), the y-axis position of the lance, and the inclination angle (ϕ).

14. An apparatus for monitoring the surface of a wall of a structure, having at least one of a distance measuring unit for measuring a distance to the wall and a photographing unit for photographing the surface of the wall, a lance for supporting the at least one of the distance measuring unit and photographing unit, and drive means for reciprocating the lance into and out of the structure, the apparatus comprising:

two heat resisting strings stretched in parallel with each other from a front end of the lance to a rear end thereof and vertically spaced away from each other;

tension means for longitudinally tensioning the strings; and deflection measuring means for detecting deflection angles (θ1, θ2) of the strings with respect to respective reference lines that run along a y-axis.

15. The apparatus of claim 15, further comprising:

lance position measuring means for detecting a y-axis position of the lance; and calculation means for calculating an inclination angle (ϕ) of the front end of the lance with respect to a y-z plane and an x-axis position of the distance measuring unit according to the deflection angles (θ1, θ2), the y-axis position of the lance, and a fitting position of the distance measuring unit.

16. A method for monitoring the surface of a wall of a structure, comprising steps of:

photographing the wall by a linear camera and providing an image signal having a z-axis distribution;

driving the camera along a y-axis so that a linear or slit-like view field of the camera is moved substantially in parallel with a z-axis and so that an optical axis of the camera crosses the wall at an angle smaller than 90 degrees, said angle being fixed by said y-driving means and the wall being substantially in parallel with a y-z plane; and displaying a two-dimensional y-z distribution whenever the camera is moved for a predetermined short distance along the y-axis image.

17. A method for monitoring the surfaces of first and second pairs of walls of a structure, comprising steps of:

photographing the walls by first and second groups of linear cameras and providing image signals having z- and x-axis distributions, respectively;

driving the first and second camera groups along a y-axis so that a linear or slit-like view field of the first camera group is moved substantially in parallel with a z-axis, so that an optical axis of the first camera group crosses the first wall pair at a first angle smaller than 90 degrees, said first angle being fixed by said y-driving means and the first wall pair being substantially in parallel with a y-z plane, so that a linear view field of the second camera group is moved substantially in parallel with an x-axis, and so that an optical axis of the second camera group crosses the second wall pair at a second angle smaller than 90 degrees, said second angle being fixed by said y-driving means and the second wall pair being substantially in parallel with an x-y plane; and displaying two-dimensional y-z and x-y distribution whenever the first and second camera groups are moved for a predetermined short distance along the y-axis images.

18. A method for monitoring the surface of a wall of a structure, comprising steps of:

photographing the wall by a linear camera and providing an image signal having a z-axis distribution;

arranging a reflection mirror on a y-axis in front of the camera, to deflect an optical axis of the camera in an x-axis direction;

driving the camera and mirror along a y-axis so that the length of the mirror is moved substantially in parallel with a z-axis, so that a linear view field of the camera is moved substantially in parallel with the z-axis, and so that the camera photographs the wall through the mirror, the wall being substantially in parallel with a y-z plane; and displaying a two-dimensional y-z distribution whenever the camera and mirror are moved a predetermined short distance along the y-axis image.

19. A method for monitoring the surface of a wall of a structure, having at least one of a distance measuring unit for measuring a distance to the wall and a photographing unit for photographing the surface of the wall, and a lance for supporting the at least one of the distance measuring unit and photographing unit, and reciprocating the lance into and out of the structure, the method comprising steps of:

stretching a heat resisting string from a front end of the lance to a rear end thereof;

longitudinally tensioning the string; and detecting a deflection angle (θ) of the string with respect to a reference line that runs along a y-axis.

20. A method for monitoring the surface of a wall of a structure, having at least one of a distance measuring unit for measuring a distance to the wall and a photographing unit for photographing the surface of the wall, and a lance for supporting the at least one of the distance measuring unit and photographing unit, and reciprocating the lance into and out of the structure, the apparatus comprising steps of:

stretching two heat resisting strings in parallel with each other from a front end of the lance to a rear end thereof and vertically spaced away from each other;

longitudinally tensioning the strings; and detecting deflection angles ($\theta 1$, $\theta 2$) of the strings with respect to respective reference lines that run along a y-axis.

21. An apparatus for monitoring the surface of a wall of a structure, comprising:

a linear camera for photographing the wall and providing an image signal having a z-axis distribution;

y-driving means for driving the camera along a y-axis so that a linear or slit-like view field of the camera is moved substantially in parallel with a z-axis and so that an optical axis of the camera crosses the wall at an angle smaller than 90 degrees, said angle being fixed by said y-driving means and the wall being substantially in parallel with a y-z plane;

an image memory;

A/D conversion means for converting the image signal into digital image data;

write means for writing the digital image data into the image memory whenever the camera is moved for a predetermined short distance along the y-axis, to store two-dimensional image data having a y-z distribution in the image memory; and means for reading the image data out of the image memory and displaying a two-dimensional image on two-dimensional output means;

wherein the linear view field of a first camera group is substantially in parallel with the z-axis and the optical axis of the first camera group crosses a first wall pair at an angle in the range of 10 to 20 degrees.

22. An apparatus for monitoring the surfaces of first and second pairs of walls of a structure, comprising:

first and second groups of linear cameras for photographing the walls and providing image signals having z- and x-axis distributions, respectively;

y-driving means for driving the first and second camera groups along a y-axis so that a linear or slit-like view field of the first camera group is moved substantially in parallel with a z-axis, so that an optical axis of the first camera group crosses the first wall pair at a first angle smaller than 90 degrees, said first angle being fixed by said y-driving means and the first wall pair being substantially in parallel with a y-z plane, so that a linear view field of the second camera group is moved substantially in parallel with an x-axis, and so that an optical axis of the second camera group crosses the second wall pair at a second angle smaller than 90 degrees, said second angle being fixed by said y-driving means and the second wall pair being substantially in parallel with an x-y plane;

an image memory;

A/D conversion means for converting the image signal provided by the first camera group into first digital image data and the image signal provided by the second camera group into second digital image data;

write means for writing the digital image data into the image memory whenever the first and second camera groups are moved for a predetermined short distance along the y-axis, to store the first digital image data as two-dimensional image data having a y-z distribution and the second digital image data as two-dimensional image data having an x-y distribution;

and means for reading the image data out of the image memory and displaying two-dimensional images on two-dimensional output means;

wherein the linear view field of the first camera group is substantially in parallel with the z-axis and the optical axis of the first camera group crosses the first wall pair at an angle in the range of 10 to 20 degrees.

* * * * *

UNITED STATES PATENT AND TRADEMARK OFFICE

CERTIFICATE OF CORRECTION

PATENT NO. : 6,002,993

DATED : December 14, 1999

INVENTOR(S) : Shuji NAITO, et al.

It is certified that error appears in the above-identified patent and that said Letters Patent is hereby corrected as shown below:

Column 3, line 41, change "...+ S." to --.......--.

Column 5, line 60, change "31" to --P3--.

Column 8, line 43, change "e" to --A--.

Column 12, line 52, do not bold "45".

Column 17, line 18, change "defec-" to --deflec---.

Column 25, line 57, change "claim 15," to --claim 14--.

Signed and Sealed this

Twenty-seventh Day of March, 2001

Attest:

Nicholas P. Godici

NICHOLAS P. GODICI

*Attesting Officer*

*Acting Director of the United States Patent and Trademark Office*